United States Patent [19]

Tani et al.

[11] Patent Number: 5,250,629
[45] Date of Patent: Oct. 5, 1993

[54] GRAFT COPOLYMER AND PROCESS FOR PRODUCING THE SAME

[75] Inventors: Noriyuki Tani; Shuji Machida; Toshinori Tazaki, all of Sodegaura, Japan

[73] Assignee: Idemitsu Kosan Co., Ltd., Tokyo, Japan

[21] Appl. No.: 802,840

[22] Filed: Dec. 6, 1991

[30] Foreign Application Priority Data

Dec. 10, 1990 [JP] Japan ............................. 2-407148
Mar. 29, 1991 [JP] Japan ............................. 3-089073

[51] Int. Cl.$^5$ ............................................. C08F 4/00
[52] U.S. Cl. ................................. 125/268; 525/267; 525/241; 525/245; 525/249; 525/235; 525/242; 525/254; 525/255; 525/259; 526/335; 526/336; 526/340; 526/340.3; 526/346; 526/347
[58] Field of Search ............... 525/268, 267, 241, 245, 525/249, 235, 242, 254, 255, 259; 526/335, 336, 340, 340.3, 346, 347

[56] References Cited

U.S. PATENT DOCUMENTS 4,414,283 11/1983 Tobias .
5,037,890 8/1991 Yokoyama et al. ................. 525/250

Primary Examiner—Morton Foelak
Assistant Examiner—D. Truong
Attorney, Agent, or Firm—Oblon, Spivak, McClelland, Maier & Neustadt

[57] ABSTRACT

There is provided a process for producing a styrenic graft copolymer which comprises copolymerizing a styrenic monomer and a styrenic monomer having a hydrocarbon radical with an unsaturated bond in the presence of a catalyst comprising as primary ingredient (A) a transition metal compound and (B) a contact product of an organoaluminum compound and a condensation agent or (C) a compound which produces an ionic complex by reacting with the above-mentioned transition metal compound and subsequently graft polymerizing an ethylenically unsaturated monomer onto the resultant styrenic copolymer.

The above-described styrenic graft copolymer is greatly improved in terms of compatibility, adhesivity, coatability and wettability while preserving heat resistance and chemical resistance thereof, and thus effective as a variety of constructional materials and compatibilizing agents. Furthermore, the composition or multilayer material comprising the above-mentioned styrenic graft copolymer is widely utilized in a variety of application field including film, sheet, especially stampable sheet, container, packaging material, automobile parts, electrical and electronic parts, etc.

15 Claims, 7 Drawing Sheets

GRAFT COPOLYMER AND PROCESS FOR PRODUCING THE SAME

BACKGROUND OF THE INVENTION

1. Field of the Invention

The present invention relates to a graft copolymer and a process for producing the same. More particularly, it pertains to a process for efficiently producing a styrenic graft copolymer having excellent impact resistance and heat resistance and favorable compatibility with other types of resins by graft copolymerizing an ethylenically unsaturated monomer onto a styrenic copolymer, especially onto a styrenic copolymer having a syndiotactic configuration; a novel styrenic graft copolymer; a resin composition containing the graft copolymer; and a multi-layer material containing the graft copolymer layer.

2. Description of the Related Arts

Heretofore, styrenic polymers produced by the radical polymerization method have been molded to various shapes by various molding methods and widely used as domestic electrical appliances, office machines, household goods, packaging containers, toys, furnitures, synthetic papers and other industrial materials. Because of their atactic configuration in stereochemical structure, however, such styrene polymers have suffered the disadvantages of inferior heat resistance and chemical resistance.

In order to solve the above-mentioned disadvantages of the styrenic polymers having atactic configuration, the group of the present inventors succeeded in the development of the styrene polymers having a high degree of syndiotactic configuration, and further the styrenic copolymers of a styrene monomer and other comonomer (refer to Japanese Patent Application Laid-Open Nos. 104818/1987, 187708/1987 and 241009/1988).

These developed styrenic polymers are excellent in heat resistance, chemical resistance and electrical properties and are expected to find application use in a variety of fields.

Nevertheless, the above developed polymers, especially syndiotactic polystyrene still involve such problems as poor compatibility with other types of resins, little adhesion to a metal, etc. and insufficient impact resistance.

Meanwhile, the polymerization of an olefinic monomer by a cationic transition metal complex has been reported since many years ago. For example, (1) Natta et. al reported the polymerization of ethylene using the composition of titanocene dichloride and triethylaluminum as the catalyst (J. Polymer Sci., 26, 120 (1964)). Breslow et. al reported the polymerization of ethylene by the use of titanocene dichloride and dimethylaluminum chloride as the catalyst (J. Chem. Soc, 79, 5072 (1957)). Further, Dyachkovskii et. al suggested that the polymerization activity of ethylene by the use of titanocene dichloride and dimethylaluminum chloride as the catalyst is based on monomethyl titanocene cations (J. Polymer Sci., 16, 2333 (1967)). However, the activity of ethylene according to the above-mentioned methods is extremely low.

In addition, (2) Jordan et. al reported the synthesis of biscyclopentadienylzirconium methyl(tetrahydrofuran) tetraphenyl borate by the reaction of dimethyl zirconocene with silver tetraphenylborate, isolation of the reaction product and the polymerization of ethylene by the use thereof (J. Am, Chem. Soc, 108, 7410 (1986)), and also the synthesis of biscyclopentadienylzirconium benzyl(tetrahydrofuran) tetraphenylborate by the reaction of benzyl zirconocene with ferrocenium tetraphenylborate and isolation of the reaction product (J. Am. Chem. Soc. 109, 4111 (1987)). It was confirmed that ethylene was slightly polymerized by the aforestated catalyst, but the polymerization activity was extremely low.

Moreover, (3) Turner et. al proposed a method for polymerizing α-olefin by the use of the combination of a boron complex containing a specific amine such as triethylammonium tetraphenylborate, triethylammonium tetratolylborate, triethylammonium tetra(pentafluorophenyl) borate and a metallocene as the catalyst (refer to Japanese Patent Application through PCT Laid-Open No. 502036/1989). However, the aforestated catalyst systems (1) through (3) are applicable only to the restricted polymerization, that is, homopolymerization of an α-olefin and copolymerization of α-olefinic comonomers and at the present time, are not actually evolved to the polymerization of a styrenic monomer.

Meanwhile, Japanese Patent Application Laid-Open No. 7705/1991 discloses a copolymer of an olefin and syndiotactic polystyrene and a copolymer of an olefin, an unsaturated carboxylic acid ester and syndiotactic polystyrene. The copolymers thus obtained are high in crystallinity when the content of a comonomer is low, but become amorphous as the content of a comonomer increases, thus making it impossible to fully realize the mechanical, thermal and chemical properties of syndiotactic polystyrene of its own.

Accordingly, the above-mentioned copolymers suffer the drawback that they can not produce a wide variety of materials which make use of the characteristics of syndiotactic polystyrene by compounding with other thermoplastic resin or filler because of the restriction to the amount of a comonomer to be copolymerized.

The use of a third component, that is, a compatibilizing agent for the resin is taken into consideration but is not favorable, since a suitable compatibilizing agent is not found because of the higher molding temperature of syndiotactic polystyrene and further, the addition of such an agent possibly causes the degradation in the performance of the composition obtained.

Attempts have been made from the different point of view to contrive the evolution of a wide range of application of syndiotactic polystyrene by forming a laminate of it and one of a variety of materials, particularly resinous materials and metals to make use of the characteristics of each of the materials to be used. As an example, syndiotactic polystyrene may be multi-layered, but the lack of interfacial adhesion between the layers causes interlaminar peeling or delamination, making the laminate practically unusable. Although the above-mentioned copolymer is excellent in terms of interfacial adhesion, they are rendered amorphous with increase in the content of a comonomer, thereby markedly degrading the performance thereof. Consequently, a laminating material with excellent properties can not be produced from such copolymers.

Under such circumstances, intensive research and investigation were continued by the present inventors in order to overcome the disadvantage of the aforesaid syndiotactic polystyrene and at the same time, develop a styrenic copolymer excellent not only in compatibility with other types of resins and adhesion with metals but also in impact resistance.

In the course of the research, it has been found that a specific styrenic copolymer onto which an ethylenically unsaturated monomer is graft polymerized possesses the characteristics meeting the foregoing object. Further research continued by the present inventors finally led to success in developing a process for producing at a high productivity a styrenic copolymer having surpassing properties at an optional graft ratio and at a high productivity by efficiently proceeding with the graft copolymerization. In addition, it has been discovered that the graft copolymer obtained by the above developed process is effective for a variety of applications.

SUMMARY OF THE INVENTION

The present invention provides a process for producing a styrenic graft copolymer which comprises copolymerizing a styrenic monomer and a styrenic monomer having a hydrocarbon radical with an unsaturated bond in the presence of a catalyst comprising as primary ingredients (A) a transition metal compound and (B) a contact product of an organoaluminum compound and a condensation agent and subsequently graft polymerizing an ethylenically unsaturated monomer onto the resultant styrenic copolymer.

The present invention further provides a process for producing a styrenic graft copolymer by the use of a catalyst comprising as primary ingredients said component (A) and (C) a compound which produces an ionic complex by reacting with the above-mentioned transition metal compound instead of the catalyst comprising as primary ingredients said components (A) and (B).

The present invention further provides a styrenic graft copolymer which is produced by graft polymerizing an ethylenically unsaturated monomer onto a copolymer of a styrenic monomer and a styrenic monomer having a hydrocarbon radical with an unsaturated bond.

The present invention still further provides a resin composition comprising said styrenic graft copolymer and at least one member selected from a thermoplastic resin, an inorganic filler and an organic filler and also provides a multi-layer material having at least one layer containing said styrenic graft copolymer.

DESCRIPTION OF THE PREFERRED EMBODIMENTS

Figure 2:
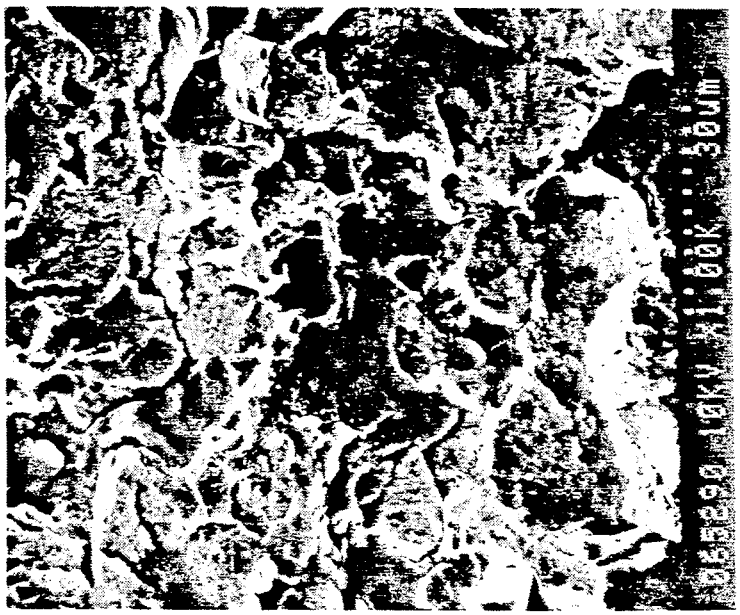
FIGS. 1 to 7 are each an electron micrograph ($\times 1000$ magnification) showing the rupture cross-section of the strand obtained in Example 17 or Comparative Examples 1 to 3.

The process according to the present invention comprises the step of producing a styrenic copolymer by copolymerizing a styrenic monomer and a styrenic monomer having a hydrocarbon radical with an unsaturated bond (Step 1) and the step of graft polymerizing an ethylenically unsaturated monomer onto said styrenic copolymer (Step 2).

As the styrenic monomer as used in the aforementioned Step 1, various types are available, but the usually used styrenic monomers I are those represented by the following general formula (1):

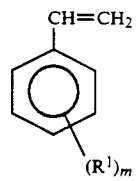

(1)

wherein $R^1$ is a hydrogen atom, a halogen atom or a substituent having at least one atom selected from carbon, oxygen, nitrogen, sulfur, phosphorus, selenium, silicon and tin, m is an integer from 1 to 3 and when m is 2 or 3, each $R^1$ may be the same or different.

Specific examples of the styrenic monomers I include alkylstyrenes such as styrene, p-methylstyrene, o-methylstyrene, m-methylstyrene, 2,4-dimethylstyrene, 2,5-dimethylstyrene, 3,4-dimethylstyrene, 3,5-dimethylstyrene and p-tert-butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; vinylbiphenyls such as 4-vinylbiphenyl, 3-vinylbiphenyl and 2-vinylbiphenyl; vinylphenylnaphthalenes such as 1-(4-vinylphenyl)naphthalene, 2-(4-vinylphenyl)naphthalene, 1-(3-vinylphenyl)naphthalene, 2-(3-vinylphenyl)naphthalene, 1-(2-vinylphenyl)naphthalene and 2-(2-vinylphenyl)naphthalene; vinylphenylanthracenes such as 1-(4-vinylphenyl)anthracene, 2-(4-vinylphenyl)anthracene, 9-(4-vinylphenyl)anthracene, 1-(3-vinylphenyl)anthracene, 2-(3-vinylphenyl)anthracene, 9-(3-vinylphenyl)anthracene, 1-(2-vinylphenyl)anthracene, 2-(2-vinylphenyl)anthracene and 9-(2-vinylphenyl)anthracene; vinylphenylphenanthrene such as 1-(4-vinylphenyl)phenanthrene, 2-(4-vinylphenyl)phenanthrene, 3-(4-vinylphenyl)phenanthrene, 4-(4-vinylphenyl)phenanthrene, 9-(4-vinylphenyl)phenanthrene, 1-(3-vinylphenyl)phenanthrene, 2-(3-vinylphenyl)phenanthrene, 3-(3-vinylphenyl)phenanthrene, 4-(3-vinylphenyl)phenanthrene, 9-(3-vinylphenyl)phenanthrene, 1-(2-vinylphenyl)phenanthrene, 2-(2-vinylphenyl)phenanthrene, 3-(2-vinylphenyl)phenanthrene, 4-(2-vinylphenyl)phenanthrene and 9-(2-vinylphenyl)phenanthrene; vinylphenylpyrenes such as 1-(4-vinylphenyl)pyrene, 2-(4-vinylphenyl)pyrene, 1-(3-vinylphenyl)pyrene, 2-(3-vinylphenyl)pyrene, 1-(2-vinylphenyl)pyrene and 2-(2-vinylphenyl)pyrene; vinylterphenyls such as 4-vinyl-p-terphenyl, 4-vinyl-m-terphenyl, 4-vinyl-o-terphenyl, 3-vinyl-p-terphenyl, 3-vinyl-m-terphenyl, 3-vinyl-o-terphenyl, 2-vinyl-p-terphenyl, 2-vinyl-m-terphenyl and 2-vinyl-o-terphenyl; vinylphenylterphenyls such as 4-(4-vinylphenyl)-p-terphenyl; vinylalkylbiphenyls such as 4-vinyl-4'-methylbiphenyl, 4-vinyl-3'-methylbiphenyl, 4-vinyl-2'-methylbiphenyl, 2-methyl4-vinylbiphenyl and 3-methyl-4-vinylbiphenyl; halogenated vinylbiphenyls such as 4-vinyl-4'-fluorobiphenyl, 4-vinyl-3'-fluorobiphenyl, 4-vinyl-2'-fluorobiphenyl, 4-vinyl-2-fluorobiphenyl, 4-vinyl-3-fluorobiphenyl, 4-vinyl-4'-chlorobiphenyl, 4-vinyl-3'-chlorobiphenyl, 4-vinyl-2'-chlorobiphenyl, 4-vinyl-2-chlorobiphenyl, 4-vinyl-3-chlorobiphenyl, 4-vinyl-4'-bromobiphenyl, 4-vinyl-3'-bromobiphenyl and 4-vinyl-3-bromobiphenyl; trialkylsilylvinylbiphenyls such as 4-vinyl-4'-trimethylsilylbiphenyl; trialkylstannylvinylbiphenyls such as 4- vinyl-4'-trimethylstannylbiphenyl and 4-vinyl-4'-tributylstannylbiphenyl; trialkylsilylmethylvinylbiphenyls such as 4-vinyl-4'-trimethylsilylmethylbiphenyl; trialkylstannylmethylvinylbiphenyls such as 4-vinyl-4'-trimethylstannylmethylbiphenyl and 4-vinyl-4'-tributylstannylmethylbiphenyl; halogen-substituted alkylstyrene such as p-chloroethylstyrene, m-chloroethylstyrene and o-chloroethylstyrene; alkylsilylstyrenes such as p-trimethylsilylstyrene, m-trimethylsilylstyrene, o-trimethylsilylstyrene, p-triethylsilylstyrene, m-triethylsilylstyrene, o-triethylsilylstyrene and p-dimethyl-tert-butylsilylstyrene; phenyl group-containing silylstyrenes such as p-dimethylphenylsilylstyrene, p-methyldiphenylsilylstyrene and p-triphenylsilylstyrene; halogen-containing silylstyrene such as p-dimethylchlorosilylstyrene, p-methyldichlorosilylstyrene, p-trichlorosilylstyrene, p-dimethylbromosilylstyrene and p-dimethyliodosilylstyrene; silyl group-containing silylstyrene such as p-(p-trimethylsilyl) dimethylsilylstyrene; and a mixture of at least two thereof.

As the styrenic monomer having a hydrocarbon radical with an unsaturated bond also as used in the Step 1, various types are available, but are usually used the styrenic monomers II represented by the following general formula:

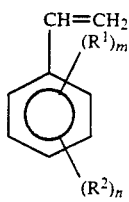
(2)

wherein $R^2$ is a hydrocarbon radical with an unsaturated bond, n is an integer of 1 or 2, and $R^1$ and m are as previously defined.

In the above-mentioned formula, $R^1$ is preferably a hydrocarbon radical having 2 to 10 carbon atoms and an unsaturated bond and exemplified by allyl group, methallyl group, homoallyl group, pentenyl group, decenyl group and the like. Specific examples of the styrenic monomers II include p-divinylbenzene, m-divinylbenzene, trivinylbenzene, a monomer having both styrene monomer skeleton and α-olefin skeleton in the same molecule, p-allylstyrene, m-allylstyrene, methallylstyrene, homoallylstyrene, butenylstyrene, pentenylstyrene, decenylstyrene and a mixture of at least two thereof.

In this case, the use of a monomer having an olefinic skeleton suppresses crosslinking reaction even at a relatively high copolymerization ratio of the monomer. Hence, such a monomer is suitable for producing a copolymer having a number of graft initiation points.

In the Step I of the process according to the present invention, a styrenic monomer and a styrenic monomer having a hydrocarbon radical with an unsaturated bond, especially the aforestated styrenic monomers I and II are copolymerized by the use of a catalyst comprising as primary ingredients (A) a transition metal compound and (B) a contact product of an organoaluminum compound and a condensation agent. As the transition metal compound (A), various types are available, but preferably used compound is at least one compound selected from those represented by the following general formula (4), (5), (6) or (7).

 (4)

 (5)

 (6)

or

 (7)

wherein $R^3$ to $R^{14}$ are each a hydrogen atom, halogen atom, alkyl group having 1 to 20 carbon atoms, alkoxyl group having 1 to 20 carbon atoms, aryl group having 6 to 20 carbon atoms, arylalkyl group having 7 to 20 carbon atoms, aryloxy group having 6 to 20 carbon atoms, acyloxy group having 1 to 20 carbon atoms, acetylacetonyl group, cyclopentadienyl group, substituted cyclopentadienyl group or indenyl group; a, b and c are each an integer from 0 to 4, satisfying the relation $0 \leq a+b+c \leq 4$; d and e are each an integer from 0 to 3, satisfying the relation $0 \leq d+e \leq 3$; f is an integer from 0 to 2, satisfying the relation $0 \leq f \leq 2$; g and h are each an integer from 0 to 3, satisfying the relation $0 \leq g+h \leq 3$; $M^1$ and $M^2$ are each a titanium atom, zirconium atom, hafnium atom or vanadium atom; and $M^3$ and $M^4$ are each a vanadium atom. Among the transition metal compounds as described above, those represented by the general formula (4) in which $M^1$ is a titanium atom or a zirconium atom are preferably used.

Among $R^3$ to $R^{14}$ represented by the foregoing formulae, specific examples of halogen atoms include chlorine atom, bromine atom, iodine atom and fluorine atom. Examples of the substituted cyclopentadienyl group include a cyclopentadienyl group replaced with at least one alkyl group having 1 to 6 carbon atoms, which is enumerated by methylcyclopentadienyl group, 1,2-dimethylcyclopentadienyl group, pentamethylcyclopentadienyl group, etc.

The symbols $R^3$ to $R^{14}$ in the above-mentioned formulae may be each independently a hydrogen atom; alkyl group having 1 to 20 carbon atoms exemplified by methyl group, ethyl group, propyl group, n-butyl group, isobutyl group, amyl group, isoamyl group, octyl group and 2-ethyl-hexyl group; alkoxyl group having 1 to 20 carbon atoms exemplified by methoxy group, ethoxy group, propoxy group, butoxy group, hexyloxy group, octyloxy group, 2-ethylhexyloxy group, etc.; aryl group having 6 to 20 carbon atoms exemplified by phenyl group, naphthyl group, etc.; arylalkyl group having 7 to 20 carbon atoms exemplified by benzyl group, phenethyl group, 9-anthrylmethyl group; or acyloxy group having 1 to 20 carbon atoms exemplified by acetyloxy group, stearoyloxy group, etc., and may be the same or different from each other provided that the above-mentioned conditions are satisfied.

Among the transition metal compounds represented by any of the foregoing general formulae (4) to (7), specific examples of titanium compounds include tetramethoxytitanium, tetraethoxytitanium, tetra-n-butoxytitanium, tetraisopropoxytitanium, cyclopentadienyltrimethyltitanium, titanium tetrachloride, titanium trichloride, dimethoxytitanium dichloride, methoxytitanium trichloride, trimethoxytitanium chloride, cyclopentadienyltriethyltitanium, cyclopentadienyltripropyltitanium, cyclopentadienyltributyltitanium, methylcyclopentadienyltrimethyltitanium, methylcyclopentadienyltribenzyltitanium, 1,2-dimethylcyclopentadienYltrimethyltitanium, tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, pentamethylcyclopentadienyltriphenyltitanium, pentamethylcyclopentadienyltribenzyltitanium, cyclopentadienylmethyltitanium dichloride, cyclopentadienylethyltitanium dichloride, pentamethylcyclopentadienylmethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium tripheoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium tripheoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, cyclopentadienyldimethylmethoxytitanium, methylcyclopentadienyldimethylmethoxytitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, and the like.

As biscyclopentadienyl-substituted titanium compounds, mention may be made of bis(cyclopentadienyl)dimethyltitanium, bis(cyclopentadienyl)diphenyltitanium, bis(cyclopentadienyl)diethyltitanium, bis(cyclopentadienyl)dibenzyltitanium, bis(methylcyclopentadienyl)dimethyltitanium, bis(pentamethylcyclopentadienyl)dimethyltitanium, bis(methyldicyclopentadienyl)dibenzyltitanium, bis(pentamethylcyclopentadienyl)dibenzyltitanium, bis(pentamethylcyclopentadienyl)chloromethyltitanium, bis(pentamethylcyclopentadienyl)hydridemethyltitanium, and the like.

In addition, mention may be made of the titanium compound having a cross-linkage type ligand such as ethylene-bis(indenyl)dimethyltitanium, ethylene-bis(tetrahydroindenyl)dimethyltitanium and dimethylsilylene bis(cyclopentadienyl)dimethyltitanium.

The aforestated transition metal compound may be in the form of a complex with a Lewis base. In the composition catalyst system of components (A) and (B) in the case where the styrenic polymer segment is required to have a higher molecular weight, the titanium compound in the form of alkoxide or having a substituted $\pi$ electron type ligand is preferable, whereas in the case where the styrene polymer segment is required to have a lower molecular weight, the titanium compound having a $\pi$ electron type ligand or halogen ligand is preferable.

Among the transition metal compounds represented by any of the above-mentioned general formulae (4) to (7), specific examples of zirconium compounds include cyclopentadienylzirconium trimethoxide, pentamethylcyclopentadienylzirconium trimethoxide, cyclopentadienyltribenzylzirconium, bisindenylzirconium dichloride, dibenzylzirconium dichloride, tetrabenzylzirconium, tributoxyzirconium chloride, triisopropoxyzirconium chloride and the like.

Likewise, specific examples of hafnium compounds include cyclopentadienylhafnium trimethoxide, pentamethylcyclopentadienylhafnium trimethoxide, cyclopentadienyltribenzylhafnium, pentamethylcyclopentadienyltribenzylhafnium, bisindenylhafnium dichloride, dibenzylhafnium dichloride, tetrabenzylhafnium, tributoxyhafnium chloride, triisopropoxyhafnium chloride and the like.

In the same way, specific examples of vanadium compounds include vanadium trichloride, vanadyl trichloride, vanadium triacetylacetate, vanadium tetrachloride, vanadium tributoxide, vanadyl dichloride, vanadyl bisacetylacetate, vanadyl triacetylacetonate and the like.

On the other hand, the component (B) of the catalyst is a contact product of an organoaluminum compound and a condensation agent. The organoaluminum compounds are usually those represented by the general formula $$AlR^{15}_3$$

wherein $R^{15}$ is an alkyl group having 1 to 8 carbon atoms, enumerated by trialkylaluminum such as trimethylaluminum, triethylaluminum and triisobutylaluminum. Among them, trimethylaluminum is preferable.

As the condensation agent, mention may be made of water as a typical one and of the compounds which cause condensation reaction with the above-mentioned trialkylaluminum, exemplified by copper sulfate pentahydrate, adsorbed water by an inorganic or organic substance and the like.

Typical examples of the contact product of an organoaluminum compound and a condensation agent, which product constitutes the component (B) of the catalyst to be used in the present invention include the contact product of an trialkylaluminum represented by the general formula $AlR^{15}_3$ and water, which is more specifically a chain alkylaluminoxane represented by the general formula (8)

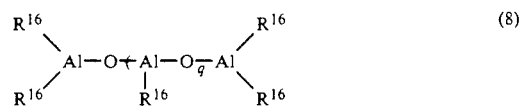

wherein q indicates degree of polymerization ranging from 0 to 50, and $R^{16}$ stands for an alkyl group having 1 to 8 carbon atoms, or a cyclic aluminoxane having a repeating unit represented by the general formula (9)

wherein $R^{16}$ is the same as above, and q indicates the number of repeating units ranging from 2 to 50.

In general, the contact product of the alkylaluminum compound such as trialkylaluminum and water contains the foregoing chain alkylaluminoxane and cyclic alkylaluminoxane together with unreacted trialkylaluminum, various mixtures of condensates and further the molecules resulting from association in an intricate manner thereof. Accordingly, the resultant contact product varies widely depending upon the conditions of contact of trialkylaluminum with water as the condensation agent.

The reaction of the alkylaluminum compound and a condensation agent is not specifically limited in the above case and may be effected according to the publicly known methods, which are exemplified by (1) a method in which an organoaluminum compound is dissolved in an organic solvent and then brought into contact with water, (2) a method in which an organoaluminum compound is first added to the reaction system at the time of polymerization and thereafter water is added thereto, and (3) a method in which an organoaluminum compound is reacted with the water of crystallization contained in metal salts and the like, or the water adsorbed in inorganic or organic materials. The above-mentioned reaction proceeds even in the absence of a solvent but is preferably carried out in a solvent. Examples of the suitable solvent to be used here include aliphatic hydrocarbons such as hexane, heptane and decane, aromatic hydrocarbons such as benzene, toluene and xylene, and the like. The aforementioned water may contain up to about 20% of ammonia, amine such as ethylamine, sulfur compound such as hydrogen sulfide, phosphorus compound such as phosphite, or the like.

The contact product (e.g, an alkylalumioxane) of an organoaluminum compound and a condensation agent, which product is used as the component (B) of the catalyst according to the present invention is effectively obtained by a method wherein the solid residue produced after contact reaction in the case of a water-containing compound being used is removed by means of filtration and the filtrate is heat treated under ordinary or reduced pressure at 30° to 200° C., preferably 40° to 150° C. for 20 minutes to 8 hours, preferably 30 minutes to 5 hours while distilling away the solvent used.

The temperature in the aforementioned heat treatment may be pertinently determined according to the various conditions, but should be usually within the above-described range. The temperature lower than 30° C. fails to bring about the prescribed effect, whereas that exceeding 200° C. causes thermal decomposition of aluminoxane itself, each resulting in unfavorable consequence.

The reaction product is obtained in the form of colorless solid or solution depending upon the heat treatment conditions, and can be used as the catalyst solution by dissolving in or diluting with a hydrocarbon solvent according to the demand.

Suitable examples of the contact product of organoaluminum compound and a condensation agent which is used as the component (B) of the catalyst, especially an alkylaluminoxane are those in which the area of the high magnetic field component in the methyl proton signal region due to the aluminum-methyl group (Al—CH$_3$) bond as observed by the proton nuclear magnetic resonance method is not more than 50% of the total signal area. That is, in a proton nuclear magnetic resonance ($^1$H-NMR) spectral analysis of the alkylaluminoxane in toluene solvent at room temperature, the methyl proton signal due to Al—CH$_3$ is observed in the region of 1.0 to −0.5 ppm (tetramethylsilane (TMS) standard). Since the proton signal of TMS (0 ppm) is in the region of the methyl proton signal due to Al—CH$_3$, the methyl proton signal due to Al—CH$_3$ is measured with 2.35 ppm methyl proton signal of toluene in TMS standard. The methyl proton signal due to Al—CH$_3$ is divided into two components: the high magnetic field component in the −0.1 to −0.5 ppm region and the other magnetic field component in the 1.0 to −0.1 ppm region. In alkylaluminoxane preferably used as component (B) of the catalyst in the present invention, the area of the high magnetic field component is not more than 50%, preferably 45 to 5% of the total signal area in the 1.0 to −0.5 ppm region.

The catalyst to be used in the process of the present invention comprises the above-mentioned components (A) and (B) as the primary ingredients, and if desired, in addition to the above two components, other catalytic component (D) may be added. The catalyst activity can be markedly improved by the addition of the catalytic component (D), which is an organoaluminum compound represented by the following general formula (10):

$$R^{17}{}_kAlY_{3-k} \qquad (10)$$

wherein $R^{17}$ is a hydrocarbon radical such as an alkyl group having 1 to 18, preferably 1 to 12 carbon atoms, alkenyl group, aryl group, aralkyl group or alkoxyl group; Y is a hydrogen atom or halogen atom; and k is an integer satisfying the relation $1 \leq k \leq 3$. Specific examples of the organoaluminum compound as component (D) include trimethylaluminum, triethylaluminum, triisobutylaluminum, dimethylaluminum chloride, diethylaluminum chloride, monomethylaluminum dichloride, monoethylaluminum dichloride, diethylaluminum ethoxide and the like and the combination of at least two thereof. Furthermore, inasmuch as the stereoregularity of the product is not impaired, the catalyst may be subjected to the addition of an organic compound having at least two hydroxyl groups, aldehyde groups or carboxyl groups, said compound being represented by the general formula (11)

$$W\text{-}R^{18}\text{-}(P)_r\text{-}R^{19}\text{-}W' \qquad (11)$$

wherein $R^{18}$ and $R^{19}$ are each a hydrocarbon radical having 1 to 20 carbon atoms, substituted aromatic hydrocarbon radical having 7 to 30 carbon atoms or substituted aromatic hydrocarbon radical having 6 to 40 carbon atoms and a substituent containing a hetero atom such as oxygen atom, nitrogen atom or sulfur atom; P is a hydrocarbon radical having 1 to 20 carbon atoms,

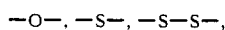
$$-O-, \quad -S-, \quad -S-S-,$$

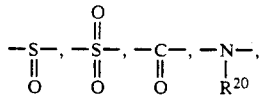
$$-\underset{\underset{O}{\|}}{S}-, \quad -\underset{\underset{O}{\|}}{\overset{\overset{O}{\|}}{S}}-, \quad -\underset{}{\overset{\overset{O}{\|}}{C}}-, \quad -\underset{R^{20}}{\overset{}{N}}-,$$

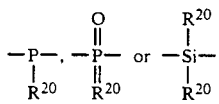
$$-\underset{R^{20}}{\overset{\overset{O}{\|}}{P}}-, \quad -\underset{R^{20}}{\overset{\overset{O}{\|}}{\underset{\|}{P}}}- \quad \text{or} \quad -\underset{R^{20}}{\overset{R^{20}}{Si}}-$$

$R^{20}$ is a hydrogen atom or hydrocarbon radical having 1 to 6 carbon atoms; W and W' are each a hydroxyl group, an aldehyde group or a carboxyl group; and r is zero or an integer of 1 through 5.

Specific examples of the organic compound represented by the above-mentioned general formula include 2,2'-dihydroxy3,3'-di-tert-butyl-5,5'-dimethyldiphenyl sulfide, 2,2'-dihydroxy-3,3'-di-tert-butyl-5,5'-dimethylphenyl ether, etc.

In the use of the above-described catalyst comprising the components (A) and (B) as the primary ingredients, the proportion of each component varies from case to case with the type of each component, the type of the styrenic monomer as the starting raw material, especially the type of each of the styrenic monomers I and II and other conditions, and can not be unequivocally determined. As a general rule, however, the molar ratio of the aluminum in the component (B) to the transition metal, for example, titanium in the component (A), that is, aluminum/transition-metal in molar ratio is 1 to $10^6$, preferably 10 to $10^4$.

In the copolymerization of a styrenic monomer and a styrenic monomer having a hydrocarbon radical with an unsaturated bond, the compounding ratio of the monomers is not specifically limited, but may be pertinently determined according to various situations, and in general, the number of graft initiation points and graft amount desired in the subsequent graft polymerization step (Step 2). In the case where the number of graft initiation points and graft amount are to be increased, they can be increased by increasing the proportion of the styrenic monomer having a hydrocarbon radical with an unsaturated bond (styrenic monomer II, etc.). In the copolymerization of the styrenic monomer I and the styrenic monomer II, the ratio of styrenic monomer II to the sum of the styrenic monomers I and II should be usually $1 \times 10^{-10}$ to 50 mol %, desirably $1 \times 10^{-8}$ to 20 mol %, more desirably $1 \times 10^{-6}$ to 15 mol %.

The ratio of the monomer to be used as the starting raw material to the catalyst to be used may be reasonably determined, but is usually 1 to $10^6$ preferably $10^2$ to $10^4$ in terms of the ratio of the styrenic monomers I and II to the aluminum in the contact product as the component (B) of the catalyst, that is, the molar ratio of styrenic monomers I and II/aluminum.

With regard to the catalyst to be used in the Step (1) of the process according to the present invention, in addition to the catalyst comprising as the primary ingredients, (A) the transition metal compound and (B) the contact product of an organoaluminum compound and a condensation agent, there is used the catalyst comprising as primary ingredients, (A) the transition metal compound and (C) the compound which produces an ionic complex by reacting with the aforementioned transition metal compound, or the catalyst comprising the foregoing components (A), (C) and (D) as the primary ingredients. The transition metal compound to be used as the component (A) may be pertinently selected from the compounds as described hereinbefore but is desirably the compound represented by any of the above-mentioned general formulae (4), (5), (6) and (7), and is more desirably the titanium compound represented by the general formula (4) wherein $R^3$ to $R^6$ are each a cyclopentadienyl group, substituted cyclopentadienyl group, an indenyl group, a substituted indenyl group, hydrogen atom, an alkyl group having 1 to 12 carbon atoms, alkoxyl group having 1 to 12 carbon atoms, aryl group having 6 to 20 carbon atoms, aryloxyl group having 6 to 20 carbon atoms, arylalkyl group having 6 to 20 carbon atoms or a halogen atom, provided that at least one of $R^3$ to $R^6$ is a cyclopentadienyl group, substituted cyclopentadienyl group, an indenyl group or a substituted indenyl group. The organoaluminum compound to be used as the component (D) may be reasonably selected from the compounds as described hereinbefore but is preferably the compound represented by the general formula (10).

The component (C) is not specifically restricted in the type so long as it is a compound which produces an ionic complex by reacting with the transition metal as component (A), but is exemplified as a preferable one by a coordination complex compound comprising a cation and an anion in which a plurality of radicals are bonded to an element selected from Groups of VB, VIB, VIIB, VIII, IB, IIB, IIIA, IVA and VA of the Periodic Table.

The preferably usable coordination complex compound as component (C) is that represented by the following formula (12) or (13):

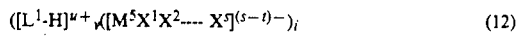

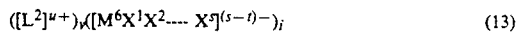

wherein $L^2$ is $M^7$, $R^{21} R^{22} M^8$ or $R^{23}{}_3C$; $L^1$ is a Lewis base; $M^5$ and $M^6$ are each an element selected from Groups of VB, VIB, VIIB, VIII, IB, IIB, IIIA, IVA and VA of the Periodic Table; $M^7$ is a metal selected from Groups IB, IIB and VIII of the Periodic Table; $M^8$ is a metal selected from Group VIII of the Periodic Table; $X^1$ to $X^s$ are each a hydrogen atom, dialkylamino group, alkoxyl group, aryloxyl group, alkyl group having 1 to 20 carbon atoms, aryl group having 6 to 20 carbon atoms, alkylaryl group, arylalkyl group, substituted alkyl group, organometalloid group or halogen atom; $R^{21}$ and $R^{22}$ each cyclopentadienyl group, substituted cyclopentadienyl group, indenyl group or fluorenyl group; $R^{23}$ is a hydrocarbon radical; t is the valency of each of $M^5$ and $M^6$ indicating an integer of 1 to 7; s is an integer of 2 to 8; u is the ion valency of each of $[L^1\text{-H}]$ and $[L^2]$, indicating an integer of 1 to 7; v is an integer of 1 or greater; and $i = u \times v/(s-t)$.

Specific examples of the Lewis base as expressed by the above $L^1$ include ethers such as dimethylether, diethyl ether and tetrahydrofuran; thioethers such as tetrahydrothiophene; esters such as ethyl benzoate; nitriles such as acetonitrile and benzonitrile; amines such as trimethylamine, triethylamine, tributylamine, N,N-dimethylaniline, 2,2'-bipyridine and phenanthroline; phosphines such as triethylphosphine and triphenylphosphine. Examples of unsaturated chain hydrocarbons include ethylene, butadiene, 1-pentene, isoprene, pentadiene, 1-hexene and derivatives thereof and those of unsaturated cyclic hydrocarbons include benzene, toluene, xylene, cycloheptatriene, cyclooctadiene, cyclooctatriene, cyclooctatetraene and derivatives thereof.

Specific examples of $M^5$ and $M^6$ include B, Al, Si, P, As, Sb, etc.; those of $M^7$ include Li, Na, Ag, Cu, etc. and those of $M^8$ include Fe, Co, Ni, etc. Specific examples of $X^1$ to $X^s$ include dialkylamino group such as dimethylamino and diethylamino; alkoxyl group such as methoxy, ethoxy and n-butoxy; aryloxyl group such as phenoxy, 2,6-dimethylpheoxy and naphthyloxy; alkyl group having 1 to 20 carbon atoms such as methyl, ethyl, n-propyl, isopropyl, n-butyl, n-octyl, and 2-ethylhexyl; aryl group, alkylaryl group or arylalkyl group each having 6 to 20 carbon atoms such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimehtylphenyl and 1,2-dimethylphenyl; halogen such as F, Cl, Br and I; and organometalloid group such as pentamethylantimony group, trimethylsilyl group, trimethylgermyl group, diphenylarsine group, dicyclohexylantimony group and diphenylboron group. Specific examples of substituted cyclopentadienyl group of $R_{21}$ and $R_{22}$ include methylcyclopentadienyl group, butylcyclopentadienyl group and pentamethylcyclopentadienyl group.

Among the compounds represented by the above-mentioned general formula (12) or (13), specific examples of preferably usable compounds include, as the compounds of the formula (12), triehtylammonium tetraphenylborate, tripropylammonium tetraphenylborate, tri-n-butylammonium tetraphenylborate, tri-n-butylammonium tetra(o,p-dimethylphenyl)borate, trimethylammonium tetraphenylborate, tri-n-butylammonium tetra(p-trifluoromethyl)borate, triphenylphosphonium tetraphenylborate, tri(methylphenyl)phosphonium tetraphenylborate, tri(dimethylphenyl)phosphonium tetraphenylborate, isopropylammonium tetra(pentafluorophenyl)borate, dicyclohexylammonium tetraphenylborate, triethylammonium tetra(pentafluorophenyl)borate, tri-n-butylammonium tetra(pentafluorophenyl)borate, triethylammonium hexafluoroarsenate, dimethylanilinium tetra(pentafluorophenyl)borate, di-n-butylanilinium tetra(pentafluorophenyl)borate, methyldiphenylammonium tetra(pentafluorophenyl)borate, p-bromo-N,N'-dimethylamilinium tetra(pentafluorophenyl)borate, etc., and as the compounds of the formula (13), ferrocenium tetraphenylborate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, trityl tetraphenylborate, trityl tetra(pentafluorophenyl)borate, silver hexafluoroarsenate, silver hexafluoroanitomonate, silver tetrafluoroborate, etc.

With regard to the catalyst to be used in the process of the present invention, in addition to the catalyst comprising the components (A) and (B) as the primary ingredients and the catalyst comprising the components (A), (B) and (D) as the primary ingredients, there are available the catalyst comprising the components (A) and (C) a primary ingredients and as another embodiment, the catalyst comprising the components (A), (C) and (D) as primary ingredient. The compounding ratio of the component (A) to the component (C) is not specifically limited, but is usually 1:0.01 to 1:100 preferably 1:1 to 1:10 each in molar ratio. The components (A) and (C) can be used by previously bringing both the components into contact with each other to form the contact product, separating and washing the resultant contact product or by bringing into contact in the polymerization system. The quantity of the components (D) to be used is usually 0 to 100 mol per one mol of the component (A). It is possible to contrive the improvement in polymerization activity by the employment of the component (D), but an excessive loading of the component (D) fails to achieve the effect corresponding to the loading. Meanwhile, the component (D) may be brought into contact with the component (A) or (C) or the contact product of the components (A) and (C) prior to adding into the polymerization system or during the successive addition of each component into the system.

The temperature, period of time and method each of polymerization in the aforestated Step (1) may be pertinently determined, but the polymerization temperature is generally 0° to 120° C.; preferably 10° to 80° C. and the polymerization time is usually 1 second to 10 hours. As the polymerization method, any of bulk, solution and suspension polymerization is available. The usable solvents in solution polymerization are enumerated by aliphatic hydrocarbons such as pentane, hexane and heptane, alicyclic hydrocarbon solvent such as cyclohexane and aromatic hydrocarbons such as benzene, toluene and xylene, among which are preferable the pliphatic hydrocarbons and aromatic hydrocarbons. In the above case, the ratio by volume of the monomer to the solvent (moner/solvent) may be optionally selected. It is desirable to set the loading of the component (C) so that the molar ratio of the monomer as starting material to the coordination complex compound becoms 1 to $10^9$, more desirably 100 to $10^7$.

In the process of the present invention, the production of the styrenic copolymer in Step 1 is followed by the graft polymerization of the ethylenically unsaturated monomer onto the copolymer in Step 2. The chemical structure of the styrenic copolymer as obtained in the Step 1 is not specifically limited. As described hereinbefore, however, in the case where the monomer having a styrene monomer skeleton and an α-olefin skeleton in the same molecule is used as the styrenic monomer having a hydrocarbon radical with an unsaturated bond and polymerized to produce the copolymer by the use of the catalyst according to the process of the present invention, a straight-chain copolymer is efficiently obtained while crosslinking reaction is suppressed even at a relatively high copolymerization ratio of the monomer. As the result of investigation on the cause of the above fact, it has been elucidated that the copolymerization is caused in the α-olefinic skeleton instead of styrenic skeleton, thereby allowing the double bond of styrene to remain unsaturated. The copolymer having such a chemical structure has never been known so far. The usable ethylenically unsaturated monomers are those represented by the following general formula:

wherein $Q^1$, $Q^2$, $Q^3$ and $Q^4$ are each a hydrogen atom, a halogen atom or a substituent having at least one atom selected from carbon atom, oxygen atom, nitrogen atom, sulfur atom, phosphorus atom, selenium atom, silicon atom and tin atom, and may be the same or different.

There are available various types of monomers copolymerizable with the repeating unit of the aforestated styrenic copolymer insofar as they are represented by the foregoing formula. Suitable examples of the above monomer include (1) acrylic acid, methacrylic acid and derivatives thereof, (2) acrylamide, methacrylamide and derivatives thereof, (3) vinyl acetate and derivatives thereof, (4) cinnamic acid, crotonic acid and derivatives thereof, (5) acrylonitrile, methacrylonitrile and derivatives thereof, (6) moleic acid, fumaric acid, maleic anhydride and derivatives thereof, (7) maleimide and derivative thereof, (8) itaconic acid, itaconic anhydride and derivatives thereof, (9) acroleins, (10) vinyl ketones, (11) diolefins, (12) styrene and derivatives thereof, (13) α-olefins and (14) cyclic olefins.

Examples of the (meth)acrylic acid derivatives in the compound (1) include allyl acrylate; isopropyl acrylate; ethyl acrylate; 2,3-epoxypropyl acrylate; 2-chloroethyl acrylate; acrylic acid chloride; cyclododecyl acrylate dibromopropyl acrylate; 6,8-dimethyl-1-oxy-5-chromanylmethyl acrylate; 1,2,2,2-tetrachloroethyl acrylate; tetrahydrofurfuryl acrylate; hydroxyethyl acrylate; hydroxypropyl acrylate; $\eta^6$-(acrylic acid 2-phenylethyl)tricarbonyl chromium; butylacrylate; 2-propynyl acrylate; benzyl acrylate; 2-(1-aziridinyl)ethyl methacrylate; p-acetylphenyl methacrylate; 2-acetoxylethyl methacrylate; 1-(9-anthryl)ethyl methacrylate; ethyl methacrylate; 2,3-epithiopropyl methacrylate; 2,3-epoxypropyl methacrylate; octadecyl methacrylate; octafluoropentyl methacrylate; p-chlorophenyl methacrylate; chloromehtyl methacrylate; 2-(diethylamino)ethyl methacrylate; cyclohexyl methacrylate; 2,6-di-tert-butylphenyl methacrylate; p-dimethylaminobenzyl methacrylate; 2-(N,N-dimethylcarbamoyloxyethyl)methacrylate; 2,6-dimethylphenyl methacrylate; 1,2,2,2-tetrachloroethyl methacrylate; trifluoroethyl methacrylate 2,2,4-trimehtyl-3-on-1-pentyl methacrylate; p-nitrophenol methacrylate; 2-pyridyl methacrylate; phenyl methacrylate; ferroceneethyl methacrylate; tert-butyl methacrylate; methacrylic acid fluoride; benzyl methacrylate; p-methylphenyl methacrylate; 3,4-methylenedioxybenzyl methacrylate; 2-mercaptobenzothiazole methacrylate; (−)-3-menthyl methacrylate; and the like.

Examples of the (meth)acrylamide derivatives of the compound (2) include N-methylacrylamide; N-ethylacrylamide; N-isopropylacrylamide; N-n-butylacrylamide; N-sec-butylacrylamide; N-isobutylacrylamide; N-tert-butylacrylamide; N-(1,1-dimethylpropyl)acrylamide; N-cyclohexylacrylamide; N-(1,1-dimethylbutyl)acrylamide; N-(1-ethyl-1-methylpropyl)acrylamide; N-(1,1,2-trimethylpropyl)acrylamide; N-n-heptylacrylamide; N-(1,1-dimethylpentyl)acrylamide; N-(1-ethyl-1-methylbutyl)acrylamide; N-(1-ethyl-1,2-dimethylpropyl)acrylamide; N-(1,1-diethylpropyl)acrylamide; N-n-octylacrylamide; N-(1,1,3,3-tetramethylbutyl)acrylamide; N-(1,2,3,3-tetramethylbutyl)acrylamide; N-(1-ethyl-1-methylpentyl)acrylamide; N-(1-propyl-1,3-dimethylbutyl)acrylamide; N-(1,1-diethylpentyl)acrylamide; N-(1-butyl-1,3-dimethylbutyl)acrylamide; N-dodecylacrylamide; N-(1-methylundecyl)acrylamide; N-(1,1-dibutylpentyl)acrylamide; N-(1-methyltridecyl)acrylamide; N-(1-methylpentadecyl)acrylamide; N-(1-methylheptadecyl)acrylamide; N-(1-adamantyl)acrylamide; N-(7,7-dimethylbicyclo 3,2,0] hepto-6-yl)acrylamide; N-allylacrylamide; N-(1,1-dimethylpropynyl)acrylamide; N-benzylacrylamide; N-phenylacrylamide; N-(2-methylphenyl)acrylamide; N-(4-methylphenyl)acrylamide; N-(1-naphthyl)acrylamide; N-(2-naphthyl)acrylamide; N-methylmethacrylamide; N-ethylmethacrylamide; N-n-butylmethacrylamide; N-tert-butylmethacrylamide; N-n-octylmethacrylamide; N-n-dodecylmethacrylamide; N-cyclohexylmethacrylamide; N-(7,7-dimethylbicyclo 3,2,0] hepto-6-yl)methacrylamide; N-allylmethacrylamide; N-(1,1-dimethylpropenyl)methacrylamide; N-benzylmethacrylamide; N-[1-(4-chlorophenyl)] ethylmethacrylamide; N-phenylmethacrylamide; N-(2-methylphenyl)methacrylamide; N-(3-methylphenyl)methacrylamide; N-(4-methylphenyl)methacrylamide; N,N-bis(2-cyanoethyl)acrylamide; N-(4-cyano-2,2,6,6-tetramethyl-4-piperidyl)acrylamide; N-(2-cyanoethyl) methacrylamide; N-(1,1-dimethyl-2-cyanoethyl)acrylamide; N-(hydroxymethyl)acrylamide; N-(methoxymethyl)acrylamide; N-(ethoxymethyl)acrylamide; N-(n-propoxymethyl)acrylamide; N-(isopropoxymethyl)acrylamide; N-(n-butoxymethyl)acrylamide; N,N'-methylenebisacrylamide; 1,2-bisacrylamideethane; 1,3-bisacrylamidepropan; 1,4-bisacrylamidebutane; 1,5-bisacrylamidepentane; 1,6-bisacrylamidehexane; 1,7-bisacrylamideheptane; 1,8-bisacrylamideoctane; 1,9-bisacrylamidenonane; 1,10-bisacrylamidedecane; 1,12-bisacrylamidedodecane; 1,1,1-trimethylamidne-2-(N-phenyl-N-acryloyl)propaneimide; 1,1-dimethyl-1-(2-hydroxy)-propylamine-N-phenyl-N-methacryloylglycineimide; N-(2-dimethylaminoethyl)acrylamide; N-(2-diethylaminoethyl)acrylamide; N-(2-morpholinoethyl)acrylamide; N-(3-dimethylaminopropyl)acrylamide; N-(3-diethylaminopropyl) acrylamide; N-(3-propylaminopropyl)acrylamide; N-3-bis(2-hydroxyethyl)aminopropyl]acrylamide; N-(1,1-dimethyl-2-dimethylaminoethyl)acrylamide; N-(2,2-dimethyl-3-dimethylaminoproyl)acrylamide; N-(2,2-dimethyl-3-diethylaminoproyl)acrylamide; N-(2,2-dimethyl-3-dibuthylaminoproyl)acrylamide; N-(1,1-dimethyl-3-dimethylaminopropyl)acrylamide; N-acryloylglycineamide; N-(2,4-dinitrophenylhydrazone)methyleneacrylamide; 2-acrylamidepropane sulfonic acid; 2-acrylamide-n-butane sulfonic acid; 2-acrylamide-n-hexane sulfonic acid; 2-acrylamide-n-butane sulfonic acid; 2-acrylamide-n-hexane sulfonic acid; 2-acrylamide-n-octane sulfonic acid; 2-acrylamide-n-dodecane sulfonic acid; 2-acrylamide-n-tetradecane sulfonic acid; 2-acrylamide-2-methylpropane sulfonic acid; 2-acrylamide-2-phenylpropane sulfonic acid; 2-acrylamide-2,4,4-trimethylpentane sulfonic acid; 2-acrylamide-2-methylphenylethane sulfornic acid; 2-acrylamide-2-(4-chlororphenyl)propane sulfonic acid; 2-acrylamide-2-carboxymethylpropane sulfonic acid; 2-acrylamide-2-(2-pyridyl)propane sulfonic acid; 2-acrylamide-1-methylpropane sulfonic acid; 3-acrylamide-3-methylbutane sulfonic acid; 2-methacrylamide-n-decane sulfonic acid; 2-methacrylamide-n-tetradecane sulfonic acid; 4-methacrylamidebenzene sulfonic acid sodium salt; N-(2,3-dimethylphenyl)methacrylamide; N-(2-phenylphenyl) methacrylamide; N-(2-hydroxyphenyl)methacrylamide; N-(2-methoxyphenyl)methacrylamide; N-(4-methoxyphenyl)methacrylamide; N-(3-ethoxyphenyl)methacrylamide; N-(4-ethoxyphenyl)methacrylamide; N-(2-chlorophenyl)methacrylamide; N-(3-chlorophenyl)methacrylamide; N-(4-chlorophenyl)methacrylamide; N-(4-bromophenyl)methacrylamide; N-(2,5-dichlorophenyl)methacrylamide; N-(2,3,5-trichlororphenyl)methacrylamide; N-(4-nitrophenyl)methacrylamide; N,N-dimethylacrylamide; N,N-diethylacrylamide; N,N-dibutylacrylamide; N,N-diisobutylacrylamide; N,N-dicyclohexylacrylamide; N,N-bis(4-methylpentyl)acrylamide; N,N-diphenylacrylamide; N,N-bis(5-methylhexyl)acrylamide; N,N-dibenzylacrylamide; N,N-bis(2-ethylhexyl)acrylamide; N-methyl-N-phenylacrylamide; N-acryloylpyrrolidine; N-acryloylpiperidine; N-acryloylmorpholine; N-acryloylthiamorpholine; N,N-dimethylmethacrylamide; N,N-diethylmethacrylamide; N,N-diphenylmethacrylamide; N-methyl-N-phenylmethacrylamide; N-methacryloylpiperidine; N-(2-hydroxyethyl)acrylamide; N-(2-hydroxypropyl)acrylamide; N-(1,1-dimethyl-2-hydroxyethyl)acrylamide; N-(1-ethyl-2-hydroxyethyl)acrylamide; N-(1,1-dimethyl-3-hydroxybutyl)acrylamide; N-(2-chloroethyl)acrylamide; N-(1-methyl-2-chloroethyl)acrylamide; N-(2,2,2-trichloro-1-hydroxyethyl)acrylamide; N-(2,2,2-trichloro-1-methoxyethyl)acrylamide; N-(1,2,2,2-tetrachloroethyl)acrylamide; N-(2,2,3-trichloro-2-hydroxypropyl)acrylamide; N-(2-chlorocyclohexyl)acrylamide; N-(2,2-difluoroethyl)acrylamide;

N-(2-2,2-trifluoroethyl)acrylamide; N-(3,3,3-trifluoropropyl)acrylamide; N-(3,3-difluorobutyl)acrylamide; N,N-bis(2,2-difluoroethyl)acrylamide; N,N-bis(2,2,2-trifluoroethyl)acrylamide; ethyl-2-acrylamideacetate; acryloyldicyandiamide; methacryloyldicyandiamide; N-(1-naphthyl)methacrylamide; N-(2-naphthyl)methacrylamide; N-formylacrylamide; N-acetylacrylamide; N-(2-oxopropyl)acrylamide; N-(1-methyl-2-oxopropyl)acrylamide; N-(1-isobutyl-2-oxopropyl)acrylamide; N-(1-benzyl-2-oxopropyl)acrylamide; N-(1,1-dimethyl-3-oxobutyl)acrylamide; and the like.

Examples of the vinyl acetate and derivatives thereof of the compounds (3) include vinyl acetate, vinyl thioacetate, vinyl α-(1-cyclohexenyl)acetate, etc.

Examples of the derivatives of cinnamic acid and crotonic acid in the compound (4) include ethyl cinnamate, phenyl cinnamate, tert-butylcinnamate, crotonaldehyde, methyl crotonate, ethyl α-cyanocrotonate, methyl α-methoxycrotonate, etc.

Examples of the (meth)acrylonitrile derivatives in the compounds (5) include vinylidene cyanide, α-methoxyacrylonitrile, α-phenylacrylonitrile, α-acetoxyacrylonitrile, etc.

Examples of the derivatives of maleic acid, fumaric acid and maleic anhydride in the compounds (6) include esters of maleic acid and fumaric acid, substituted maleic acid, fumaric acid and maleic anhydride, which derivatives being specifically exemplified by diethylfumarate, diphenylfumarate, fumaronitrile, methylfurmaric acid, diethylmethyl fumarate, methylmaleic anhydride, dimethylmaleic anhydrride, phenylmaleic anhydride, diphenylmaleic anhydride, chloromaleic anhydride, dichloromaleic anhydride, fluoromaleic anhydride, difluoromaleic anhydride, bromomaleic anhydride, dibromomaleic anhydride, methylmaleic acid, dimethylmaleic acid, phenylmaleic acid, chloromaleic acid, dichloromaleic acid, fluoromaleic acid, difluoromaleic acid, bromomaleic acid, dimethylmaleate, diethylmaleate, diethylmethyl maleate, dipropyl maleate, diisopropyl maleate, dibutyl maleate, diisobuty maleate, dipentyl maleate, diisopentyl maleate, dihexyl maleate, diheptyl maleate, dioctyl maleate, bis(2-ethylhexyl)maleate, dinonyl maleate, dihexadecyl maleate, dipropargyl maleate, bis[2-(2-chloroethyoxy)ethyl] maleate, dibenzyl maleate, methylallyl maleate, methyl-2-butenyl maleate, methyl-3-butenyl maleate, allyl-3-methylthiopropyl maleate, allyl-3-ethylthiopropyl maleate, allyl-3-acetylthiopropyl maleate, allyl-3-phenylthiopropyl maleate, methyl-p-chlorophenyl maleate, butyl-p-chlorophenyl maleate, benzyl-p-chlorophenyl maleate, diphenyl maleate, di-m-cresyl maleate, di-p-cresyl maleate, n-heptyl maleate, nonyl mateate, decyl maleate, dodecyl maleate, octadecyl maleate, fluoroalkyl maleate and the like.

Examples of the maleimide derivatives in the compound (7) include n-butylmaleimide, N-phenylmaleimide, N-(2-methylphenyl)maleimide, N-cyclohexylmaleimide, N-(2,6-dimethyl)maleimide, N-(2,6-diethyl)maleimide, N-(α-naphthyl)maleimide, etc.

Examples of the derivatives of itaconic acid and itaconic anhydride in the compounds (8) include diethyl itaconate, di-n-octyl itaconate, cis-glutaconic acid, diethyl cis-glutaconate, trans-glutaconic acid, diethyl trans-glutaconate, etc.

Examples of acroleins in the compounds (9) include acrolein, methacrolein, α-chloroacrolein, β-cyanoacrolein, etc.

Examples of vinyl ketones in the compounds (10) include methyl vinyl ketone, phenyl vinyl ketone, ethyl vinyl ketone, n-propyl vinyl ketone, cyclohexyl vinyl ketone, isobutyl vinylketone, etc.

Examples of diolefins (dienes) of the compounds (11) include 1,3-butadiene, isoprene, 1-ethoxy-1,3-butadiene, chloroprene, 1-methoxy-1,3-cyclohexadiene, 1-acetoxy-1,3-butadiene, 2-acetoxy-3-methyl-1,3-butadiene, 1-chloro-1,3-butadiene, 1-(4-pyridyl)-1,3-butadiene, muconic acid, diethyl muconate, etc.

As styrene and derivatives thereof of the compounds (12), there may be used the styrenic monomers I represented by the foregoing general formula (1).

In addition to the above, there may be used styrene derivatives each having a hetero atom such as oxygen atom or nitrogen atom including p-dimethylaminostyrene, butyl styrene-sulfonate, p-nitrostyrene, p-hydroxystyrene, 2,3-epoxypropyl, p-vinylbenzoate, p-vinylbenzoyl chloride, phenyl p-vinylbenzoate, methyl p-vinylbenzoate, 3-methoxyphenyl p-vinylbenzoate, p-isopropenylphenol, p-cyanostyrene, p-acetoxystyrene, etc., or α-methylstyrenes.

Examples of α-olefins of the compounds (13) include ethylene, propylene, 1-butene, 1-octene, 4-methylpentene-1,3-methylbutene-1, etc.

Examples of cyclic olefins of the compounds (14) include monocyclic olefins such as cyclobutene, cyclopentene and cyclohexene; substituted monocylic olefins such as 3-methylcyclopentene and 3-methylcyclohexene; polycyclic olefins such as norbornene, 1,2-dihydroxy-dicyclopentadiene and 1,4,5,8-dimethano-1,2,3,4,4a,5,8,8a-octahydronaphthalene; and substituted polycyclic olefins such as 5-methylnorobornene, 5-ethylnorbornene, 5-propylnorbornene, 5,6-dimethylnorbornene 1-methylnorbornene, 7-methylnorbornene, 5,5,6-trimethylnorbornene, 5-phenylnorbornene, 5-benzylnorobornene, 5-ethylidenenorbornene, 5-vinylnorbornene, 2-methyl-1,4,5,8-dimetano-1,2,3,4,4a,5,8,8a-octohydronaphthalene, 2-ethyl1,4,5,8-dimethano-1,2,3,4,4a,5,8,8a-octohydronaphthalene, 2,3-dimethyl-1,4,5,8-dimetano-1,2,3,4,4a,5,8,8a-octohydronaphthalene, 5-chloronorbornene, 5,5-dichloronorbornene, 5-fluoronorbornene, 5,5,6-trifluoro6-trifluoromethylnorbornene, 5-chlorormethylnorbornene, 5-methoxy-norbornene and 5-dimethylaminonorbornene.

The above-mentioned monomers are properly selected according to the purpose of use of the graft copolymers to be obtained. For example, for the purpose of improving adhesion, preferable monomers are those each having a polar group such as unsaturated carboxylic acid or derivatives thereof. In order to improve heat resistance in addition to the above, preferable monomers are those maleimide or derivatives thereof, cyclic olefins such as norbornene including ethylenically unsaturated monomers causing a high glass transition temperature of the polymer to be obtained.

In carrying out the graft polymerization of Step 2 according to the process of the present invention, the foregoing ethylenically unsaturated monomer is added to the styrenic copolymer obtained in Step 1 to effect the polymerization reaction after the unreacted styrenic monomers I and II and the catalyst in Step I are removed as necessary. As the graft polymerization is usually advanced by a polymerization initiator or light irradiation, the ethylenically unsaturated monomer may be added to the styrenic copolymer prior to, during or after the addition of a polymerization initiator to the copolymer or irradiation of the copolymer with light to activate the reaction system and proceed with graft copolymerization.

There are available various types of polymerization initiators which have heretofore been used, including anionic polymerization initiators, cationic polymerization initiators and radical polymerization initiators. In addition, the polymerization can be initiated by heat, light (UV ray, visible ray, infrared ray), electron ray, radiation or the like. In the case of grafting α-olefin such as ethylene or propylene, styrenes or cyclic olefins, the use of the catalyst comprising a transition metal and an organometal as the main components can enhance the graft ratio as well as grafting amount.

The aforementioned anionic polymerization initiators are exemplified by alkali metal (Cs, Rb, K, Na, Li), alkylated alkali metal (n-butyl-Li, octyl-K, dibenzyl-Ba), aromatic complex of alkali metal (Na-naphthalene), amidated alkali metal (KNH$_2$, LiN(C$_2$H$_5$)$_2$), etc.

The above-mentioned cationic polymerization initiators are exemplified by Bronsted acid, carbanium ion salt, halogen, etc. Examples of the Bronsted acid include hydrogen halide (HCl, HI, etc.), oxoacid (sulfuric acid, methanesulfonic acid, etc.), super strong acid and derivatives thereof (HClO$_4$, CF$_3$SO$_3$H, ClSO$_3$H, ClSO$_3$H, CH$_3$COClO$_4$, etc.), metallic oxide (silica-alumina, CrO$_3$, MoO$_3$, etc) and other solid acid (poly(styrene-sulfonic acid)), Nafion-H, sulfuric acid-aluminum sulfate complex, etc.) Examples of the carbanium ion salt include triphenylmethyl salt (Pb$_3$C$^+$Base$^-$), tropylium salt (C$_7$H$_7$$^+$Base$^-$)(Base$^-$ shows SbCl$_6$$^-$, SnCl$_5$, PF$_6$, ClO$_4$$^-$, etc.). Examples of halogen include I$_2$, IBr, etc. There are also exemplified metal halides (AlCl$_3$, SnCl$_4$, SnBr$_4$, TiCl$_4$, FeCl$_3$, BF$_3$, BCl$_3$, etc.), organometallic compounds (RAlCl$_2$, R$_2$AlCl, R$_3$Al, R$_2$Zn wherein R is an alkyl group such as methyl or ethyl).

The radical polymerization initiators are exemplified by peroxides, azo compounds and other compounds. Examples of the peroxides include acetyl peroxide, cumyl peroxide, tert-butyl peroxide, propionyl peroxide, benzoyl peroxide, 2-chlorobenzoyl peroxide, 3-chlorobenzoyl peroxide, 4-chlorobenzoyl peroxide, 2,4-dichlorobenzoyl peroxide, 4-bromomethylbenzoyl peroxide, lauroyl peroxide, potassium persulfate, diisopropyl peroxycarbonate, tetralinhydroperoxide, 1-phenyl-2-methylpropyl-1-hydroperoxide, tert-butyl pertriphenylacetate, tert-butylhydroperoxide, tert-butyl performate, tert-butyl peracetate, tert-butyl perbenzoate, tert-butyl perphenylacetate, tert-butyl per4-methoxyacetate, tert-butyl perN-(3-tolyl)carbamate and the like. Specific examples of the azo compounds include 2,2'-azobispropane; 2,2'-dichloro2,2'-azobispropane; 1,1'-azo(methylethyl)diacetate; 2,2'-azobis(2-amidinopropane)hydrochloride; 2,2'-azobis(2-amidinopropane)nitrate; 2,2'-azobisisobutane; 2,2'-azobisisobutylamide; 2,2'-azobisisobutylonitrile; 2,2'-azobisisobutylonitrile/SnCl$_4$ (1/21.5); methyl 2,2'-azobis-2-methylpropionate; 2,2'-dichloro-2,2'-azobisbutane; 2,2'-azobis-2-methylbutylonitrile; dimethyl 2,2'-azobisisobutyrate; dimethyl 2,2'-azobisisobutyrate/SnCl$_4$ (1/19.53); 1,1'-azobis(sodium 1-methylbutylonitrile-3-sulfonate); 2-(4-methylphenylazo)-2-methylmalonodinitrile; 4,4'-azobis-4-cyanovaleric acid; 3,5-dihydroxymethylphenylazo-2-methylmalonodinitrile; 2-(4-bromophenylazo)-2-allyl-malonodinitrile; 2,2'-azobis-2-methylvaleronitrile; dimethyl 4,4-azobis-4-cyanovalerate; 2,2'-azobis-2,4-dimethylvaleronitrile; 1,1'-azobiscyclohexanenitrile; 2,2'-azobis-2-propylbutylonitrile; 1,1'-azobis-1-chlorophenylethane; 1,1'-azobis-1-cyclohexanecarbonitrile; 1,1-azobis-cycloheptanenitrile; 1,1'-azobis-1-phenylethane; 1,1'-azobiscumene; ethyl 4-nitrophenylazobenzylcyanoacetate; phenylazodiphenylmethane; phenylazotriphenylmethane; 4-nitropehnylazotriphenylmethane; 1,1'-azobis-1,2-diphenylethane; poly(bisphenolA-4,4'-azobis-4-cyanopentanoate); poly(tetraethyleneglycol-2,2'-azobisisobutyrate) and the like.

Examples of the other compounds include 1,4-bis(-pentamethylene)-2-tetrazene, 1,4-dimethoxycarbonyl-1,4-diphenyl-2-tetrazene, benzene sulfonylazide, etc.

In the case of grafting α-olefin such as ethylene or propylene, styrene or cyclic olefins by the use of the catalyst comprising a transition metal and an organometal as the primary ingredients, there may be employed a compound of chromium, nickel or neodymium as the transition metal instead of the compound of the formula (4), (5), (6) or (7). As the organometal compound, the aluminoxane of the general formula (8) or (9) or the organoaluminum compound of the general formula (10) may be used.

The polymerization reaction in the graft polymerization step (Step 2) according to the process of the present invention is effected by the use of the above-mentioned starting material and initiator under properly selected conditions. As the conditions of reaction of styrenic copolymer obtained in Step (1) with the initiator, the reaction temperature may be pertinently selected in the range of −100° to 200° C., preferably −80° to 120° C. with the reaction time ranging from 1 second to 10 hours. The graft efficiency can be enhanced by reacting the initiator such as alkylated lithium with the styrenic copolymer obtained in the Step (1), followed by washing the unreacted residual initiator. In the case where the grafting chain and the unreacted styrenic monomer are formed into copolymerized chain, the ethylenically unsaturated monomer may be added, together with the graft initiator into the reaction system after the synthesis of the graft precursor in Step 1. The use of the catalyst which is used in Step 1 and also usable in the graft polymerization in Step 2, for example, in the case of α-olefin such as ethylene or prorpylene, or diolefin such as butadiene or isoprene being selected as the ethylenically unsaturated monomer, enables the graft copolymer to be produced at an extremely high efficiency. Meanwhile, the molar ratio of the initiator to the styrenic monomer II used in Step 1 is ususally $1 \times 10^{-7}$ to 10. The graft polymerization conditions are not specifically limited but properly determined according to various situations. As a general rule, the molar ratio of the styrenic monomer II used in Step 1 to the ethylenically unsaturated monomer to be grafted is 0.01 to 500, preferably 0.1 to 300. The polymerization temperature is properly determined in the range of −100° to 200° C., preferably −80° to 120° C. with the reaction time ranging from 5 seconds to 24 hours.

As the polymerization method in the aforestated Step 2, any of bulk, solution and suspension polymerization is available. The usable solvents in solution polymerization are exemplified by aliphatic hydrocarbons such as pentane, hexane and heptane, alicyclic hydrocarbons such as cyclohexane, aromatic hydrocarbons such as benzene, toluene and xylene, and polymerization solvents each having a hetero atom such as oxygen, nitrogen or sulfur. The solvent to be used in Step 2 may be the same as or different from that used in Step 1. Moreover, the residual unreacted monomer and the catalyst may be removed and in order to enhance the graft efficiency, a cleaning step may be put into practice.

The graft copolymer obtained by the process of the present invention is the styrenic copolymer in which the stereostructure, preferably the main chain structure is of syndiotactic configuration (specifically cosyndiotactic configuration of the repeating units derived from the styrenic monomer I and the repeating unit derived from the styrenic monomer II), particularly desirably of a high degree of syndiotactic configuration.

The molecular weight of the main chain in the graft copolymer thus obtained varies depending on the polymerization conditions, etc., but the weight-average molecular weight thereof is generally 1,000 to 3,000,000, preferably 5,000 to 2,500,000 as determined by means of gel permeation chromatography(GpC) using 1,2,4-trichlororbenzene at 135° C., expressed in terms of polystyrene,.

The styrenic copolymer having a high degree of the syndiotactic configuration means that its stereochemical structure is of high degree of syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity s determined by the $^{13}$C-NMR method can be indicated in terms of proportions of structural units continuously connected to each other, i.e., a diad in which tow structural units are connected to each other, a triad in which three structural units are connected to each other and a pentad in which five structural units are connected to each other. "The styrene copolymers having a high degree of syndiotactic configuration" as mentioned in the present invention usually means those having such a syndiotacticity that the proportion of racemic diad is at least 75%, preferably at least 85%, or the proportion of racemic pentad is at least 30%, preferably at leat 50% each in the chain of the styrenic repeating units.

On the other hand, the stereostructure of the graft chain of the aforestated graft copolymer is not specifically limited, but results in atactic, isotactic or syndiotactic configuration depending upon the type of the polymerization initiator and the like.

The graft copolymers of the present invention thus obtained have a variety of molecular weights, and preferably are those having a content of the graft segment of 0.005 to 99% by weight and a reduced viscosity of 0.01 to 20 dl/g as measured at a concentration of 0.05 g/dl in 1,2,4-trichlorobenzene at 135° C. An unreasonably low reduced viscosity results in failure to sufficiently exhibit the properties of the polymer, whereas an excessively high reduced viscosity causes inferior processablility.

The graft copolymer thus obtained are those wherein both the styrenic unit derived from the styrenic monomer particularly constituting the main chain (Styrenic monomer I, etc.) and the styrenic unit derived from the styrenic monomer having a hydrocarbon radical with an unsaturated bond (Styrenic monomer II) constitute a syndiotactic configuration (preferably a cosyndiotactic configuration) onto which is grafted the ethylenically unsaturated monomer (preferably the monomer having a polar group). The content of the graft monomer in the graft polymer is not always uniform varying with the monomer used, the number of grafting initiation points and the like, but usually ranges from 0.005 to 90% by weight, preferably from 0.01 to 70% by weight.

The resin composition according to the present invention comprises the above-mentioned styrenic graft copolymer compounded with at least one material selected from thermoplastic resin, inorganic filler and organic filler. Various types of thermoplastic resins are available and exemplified by polyolefin resin, polystyrene resin including that of syndiotactic configuration, condensation high polymer, addition polymerization high polymer, etc. Specific examples of polyolefin resins include high density polyethylene, low density polyethylene, poly-3-methyl-butene-1, poly-4-methyl-pentene-1, straight-chain low density polyethylene obtained by the use of such a comonomer as butene-1, hexene-1, octene-1, 4-methylpenten-1,3-methylisobutene or the like, ethylene/vinyl acetate copolymer, ethylene/acrylic acid copolymer ethylene/acrylic-ester copolymer, ethylenic ionomer, polypropylene, etc. Specific examples of polystyrene resin include general-purpose polystyrene, isotactic polystyrene, syndiotactic polystyrene, high impact polystyrene (rubber modified), etc. Specific examples of the condensation polymer include polyacetal resin, polycarbonate resin, polyamide resin such as nylon 6 and nylon 6 6, polyester resin such as polyethylene terephthalate and polybutylene terephthalate, polyphenylene oxide resin, polyimide resin, polysulfone resin, polyethersulfone resin, polyphenylene sulfide resin, etc.

Specific examples of addition polymer include a polymer consisting of polar vinyl monomers, a polymer consisting of diene monomers, etc. enumerated by poly(methyl methacrylate), polyarylonitrile, acrylonitrile/butadine copolymer, acrylonitrile/butadiene/styrene copolymer, a polymer having hydrogenated diene chains, thermoplastic elastomer, etc. Each of the above-described thermoplastic resins may be used alone or in combination with at least one of others.

The types of inorganic filler and organic filler to be used are not specifically restricted, but may be the known types having a variety of forms such as powder, granule, liquid, whisker, fiber, etc. Specific examples include silica, diatomaceous earth, alumina, titanium dioxide, magnesium oxide, pumice powder, pumice balloon, aluminum hydroxide, aluminum nitride, magnesium hydroxide, basic magnesium carbonate, dolomite, calcium sulfate, potassium titanate, barium titanate, barium sulfate, calcium sulfite, talc, clay, mica, asbestos, glass fiber, glass flake, glass bead, calcium silicate, montmorillonite, bentonite, carbon black, graphite, aluminum powder, molybdenum disulfide, carbon fiber, boron fiber, silicon carbide filber, ultra-high molecular polyethylene fiber, polypropylene fiber, polyester fiber, polyamide fiber, Kevlar fiber, metallic fiber, and furthermore, thermosetting resin such as phenolic resin, epoxy resin and unsaturated polyester fiber, and cured powder thereof.

The styrenic graft copolymer or the composition thereof according to the present invention may be subjected to the addition of at least one additive enumerated by heat resistant stabilizer, weatherproof stabilizer, antistatic agent, sliding agent, anti-blocking agent, anti-fogging agent, lubricant, foaming agent, dye, pigment, natural oil, synthetic oil, wax, etc. in a pertinent compounding ratio. Specific examples of the stabilizers to be optionally compounded include phenolic antioxidant such as tetrakis [methylene-3(3,5-di-tert-butyl-4-hydroxyphenyl)propionate]methane, β-(3,5-di-tertbutyl-4-hydroxyphenyl)propionic alkylester and 2,2'-oxamindebis-[ethyl-3(3,5-di-tert-butyl-4-hydroxyphenyl)]propionate; metallic salt of fatty acid such as zinc stearate, calcium stearate and calcium 12-hydroxystearate; polyhydric alcohol-fatty acid ester such as glycerol monostearate, glycerol monolaurate, glycerol distearate, pentaerythritol monostearate, pentaerythritol distearate and pentaerythritol tristearate. Each of the aforementioned additives may be compounded alone or in combination with other additive/s, which combination being exemplified by tetrakis[methylene-3(3,5-di-tert-butyl-4-hydroxyphenyl)propionate] methane, zinc stearate and glycerol monostearate.

The compounding ratio of the styrenic graft copolymer to the thermoplastic resin in the resin composition of the present invention varies with the conditions and can not be unequivocally determined, but may be usually determined according to the following standard.

In the case where the thermoplastic resin is a syndiotactic polystyrene (SPS), the primary object of the resin composition is to compensate for the drawback of poor adhesion and compatibility of SPS, unnecessitating a large amount of the graft chain component, and therefore the SPS loading should be relatively low for the composition with the styrenic graft copolymer with less content of graft chain component and relatively high for the composition with much content of graft chain component.

For the thermoplastic resin other than SPS, the content of the graft chain component in the styrenic graft copolymer is preferably relatively low for the purpose of making the most of the SPS characteristics. In the case where SPS and other thermoplastic resin is together added to the styrenic graft copolymer, the content of the graft chain component should be determined for the optimum range according to the combination with the resin to be used, since the copolymer functions as the compatibilizing agent for SPS and the thermoplastic resin.

Taking the factors as above into consideration, as to the compounding ratio of the styrenic graft copolymer to the thermoplastic resin, the resin composition of the present invention usually comprises 0.5 to 99.5% by weight, preferably 1 to 90% by weight of the former and 99.5 to 0.5% by weight, preferably 90 to 1% by weight of the latter.

In the case where the resin composition of the present invention comprises the styrenic graft copolymer and the inorganic or organic filler, the content of the former is usually 20 to 95% by weight, preferably 40 to 90% by weight, While the content of the latter is usually 80 to 5% by weight, preferably 60 to 10% by weight.

In the resin composition of the present invention, the styrenic graft copolymer may be compounded with the thermoplastic resin together with the inorganic or organic filler, in this case, however, the content by weight of the sum of the copolymer and the resin is usually 20 to 95%, preferably 40 to 90%, whereas the content by weight of the filler is usually 80 to 5%, preferably 60 to 10%.

The resin composition of the present invention can be prepared by various precedures, usually by the conventional melt kneading by the use of a known means such as a uniaxial or biaxial extruder, kneader, continuous mixer or mixing roll, or by means of solution blending using a suitable solvent.

Moreover, the multi-layer material according to the present invention comprises at least one layer containing at least in part the above-mentioned styrenic graft copolymer and at least one layer, molding or the like made of a different material which layers being laminated or bonded. The different material is not specifically restricted but is usually selected from a resin, metal (including alloy), ceramics (including metallic oxide), glass, paper, fiber and wood. The resin may be any of thermoplastic resin and thermosetting resin. The specific examples of the thermoplastic resins are as described hereinbefore. The specific examples of the thermosetting resins include phenolic resin, epoxy resin, unsaturated polyester resin, fiber reinforced material therefrom, etc. The specific examples of the metals and ceramics are as described hereinbefoer.

Each layer or part constituting the multi-layer material of the present invention may be in a variety of shapes and states including, for example, film, sheet, fiber (textile), moldings, sinter, single crystal, form, porous material, etc.

The method of multi-layering the materials is not specifically limited, but may be in accordance with any of the various conventional methods, exemplified by coextrusion, lamination, etc. for the different material being a thermoplastic resin. When the different material is a metal, particularly the metal to be laminated is comparetively thin, lamination, metal vapor deposition, electrostatic coating and the like are available. When a material is laminated onto a molding or a thick material, there is available a method in which the molding or the thick material is covered with a film or sheet by heat fusion, impregnation or coating.

In the multi-layer material of the present invention, at least one layer contains at least in part the aforestated styrenic graft copolymer. The layer may consist of the styrenic copolymer alone or the composition of the copolymer and the other material (thermoplastic resin and/or filler). In particular, the composition of the present invention may be applied to the composition with other material.

The multi-layer material of the present invention may be in a variety of shapes and states and comprises the layers of film, sheet, fiber, moldings, sinter, single crystal, foam or porous material, the surface of which contains at least in part the styrenic graft copolymer, said layers being laminated or covered by impregnation or coating, etc. or comprises the complex material thereof.

The styrenic copolymer of the present invention is greatly improved in terms of compatibility, adhesivity and wettability while particularly preserving the heat resistance and chemical resistance inherent to SPS. Accordingly, it facilitates the production of a composite material with other resin, glass fiber, filler such as talc, ceramics, metal, etc., enabling the application and development of the syndiotactic styrenic resin in the field of composite materials as well as the effective utilization thereof as a modifier, compatibilizing agent and the like for a variety of resins.

Furthermore, the composition or multi-layer material according to the present invention is widely utilized in various application fields including film, sheet, especially stampable sheet, container, packaging material, automobile parts, electrical and electronic parts, etc.

In the following, the present invention will be described in more detail with reference to the examples, which are by no means understood to limit the scope of the present invention.

EXAMPLE 1

(1) Preparation of methylalumioxane

In a 500 ml glass vessel which had been purged with argon were placed 200 ml of toluene, 17.7 g (71 mmol) of copper sulfate pentahydrate ($CuSO_4 \cdot 5H_2O$) and 24 ml (250 mmol) of trimethylaluminum, which were then reacted at 40° C. for 8 hours. Then, the solids were separated from the reaction mixture and the toluene was distilled away from the solution as obtained above under reduced pressure to obtain 6.7 g of a contact product. The molecular weight thereof as determined by the freezing point depression method was 610. Further, when the area of the high magnetic field component by $^1$H-NMR spectral analysis based on Japanese Patent Application Laid-Open No.325391/1987, that is, the proton nuclear magnetic resonance spectral of the methylaluminoxane in toluene soluent at room temperature was observed, the methyl proton signal due to Al—$CH_3$ was observed in the region of 1.0 to −0.5 ppm (tetramethylsilane (TMS) standard). Since the proton signal of TMS (0 ppm) was in the region of methyl proton signal due to Al—$CH_3$, the methyl proton signal due to Al—$CH_3$ was measured with 2.35 ppm methyl proton signal of toluene in TMS, and the methyl proton signal due to Al—$CH_3$ was divided into two components. As the result, the high magnetic field component (i.e −0.1 to −0.5 ppm) was 43% of the total signal area.

(2) Production of p-methylstyrene/divinylbenzene copolymer

In a 0.5 1, (L=liter) reaction vessel equipped with a stirrer which had been purged with nitrogen followed by heating to 70° C., was placed a mixture of 50 ml of sufficiently dried toluene, 50 ml of p-methylstyrene and 3.0 ml of a monomer containing 66.1% by weight of divinylbenzene (meta-, para- mixture) and 33.9% by weight of ethylstyrene (meta-, para- mixture), and were further placed 1.5 mM of methylaluminoxane obtained in the preceding item (1) and 1.5 mM of triisobutylaluminum (TIBA) with stirring for 30 minutes. Then, 0.003 mM of pentamethylcyclopentadienyltitanium trimethoxide was added to the resultant mixture to effect reaction for 2 hours. Thereafter, 1/10 of the reaction product was taken out under uniform state with stirring and the reaction was arrested by methanol injection. subsequently, a mixture of HCl and methanol was added to decompose the catalyst component.

The resultant styrenic copolymer was washed with methyl ethyl ketone (MEK) containing 2% by weight of p-tert-butylcatechol at 50° C. for 2 hours, and the insoluble content was 99%. The MEK-insoluble styrenic copolymer was dissolved in chloroform to produce a solution of the styrenic copolymer in chloroform. The styrenic copolymer soluble in chlorofolm had a weight-average molecular weight of 658,000 and a number-average molecular weight of 180,000.

Here, it will be proved that the styrenic copolymer thus obtained was a heat-sensitive copolymer having syndiotactic configuration from the results of infrared spectroscopic analysis (IR) and nuclear magnetic resonance (NMR) analysis.

(a) IR analysis

In the IR spectrum of the styrene copolymer, a peak assigned to the double bond remaining in the polymerization site of the divinylbenzene was confirmed at 1630 $cm^{-1}$.

(b) NMR analysis

As the result of a $^{13}$C-NMR analysis of the styrenic copolymer, aromatic ring $C_1$ carbon signals were observed at 145.1 ppm, 144.9 ppm and 142.3 ppm, proving that the stereostructure of the copolymer was syndiotactic.

(3) Graft polymerization of methyl methacrylate (MMA)

The aforementioned p-methylstyrene/divinylbenzene copolymer was washed with 200 ml of toluene 3 times to remove the unreacted monomer and catalyst, followed by adding toluene to make the total volume of 300 ml.

Then, 4 mM of n-butyllithium (n-BuLi) was added to effect reaction at room temperature for 8 hours. the reaction product was washed with 200 ml of toluene 3 times to remove the unreacted n-BuLi, followed by adding toluene to make the total volume of 300 ml.

Thereafter, the reaction system was rapidly cooled with dry ice/methanol at −78° C., and 20 ml of MMA was added dropwise to effect reaction for 8 hours. Then, the reaction was arrested by methanol injection.

The MMA-grafted styrenic copolymer was obtained at a yield of 4.2 g. In the IR spectrum of the copolymer, a peak assigned to the double bond (C=O) of MMA was confirmed at 1730 $cm^{-1}$. Also, the disappearance of the peak assigned to the double bond of divinylbenzene was confirmed at 1630 $cm^{-1}$.

The graft copolymer thus obtained had a reduced viscosity of 1.98 dl/g as measured at a concentration of 0.05 g/dl in 1,2,4-trichlorobenzene at 135° C. As a result of $^{13}$C-NMR analysis of the copolymer in 1,2,4-trichlorobenzene at 135° C., aromatic signals assigned to SPS were observed at 145.4 ppm, proving the syndiotactic configuration of the styrenic chain. In addition, the copolymer had a tacticity of 95% in terms of racemic diad as measured by $^{13}$C-NMR analysis and a ratio by weight of p-methylstyrene to MMA of 1:2.75 as measured by NMR analysis.

EXAMPLE 2

The procedure in Example 1 (2) and (3) was repeated except that styrene was used in place of p-methylstyrene in producing styrenic copolymer to produce MMA-grafted styrene/divinylbenzene copolymer at a yield of 5.8 g. In the IR spectrum of the graft copolymer, a peak assigned to the double bond (C=O) of MMA was confirmed at 1730 $cm^{-1}$.

The graft copolymer had a reduced viscosity of 1.98 dl/g as measured at a concentration of 0.05 g/dl in 1,2,4-trichlorobenzene at 135° C.

In addition, the graft copolymer had a tacticity of 95% in terms of racemic diad as measured by $^{13}$C-NMR analysis and a ratio by weight of styrene to MMA of 1:2.82 as measured by NMR analysis.

EXAMPLE 3

The procedure in Example 2 was repeated except that acrylonitril was used in place of MMA in the graft polymerization to produce acrylonitrile-grafted styrene/divinylbenzene copolymer at a yield of 25.2 g. In the IR spectrum of the copolymer, a peak assigned to the acrylonitrile was confirmed at 2240 $cm^{-1}$.

The graft copolymer had a reduced viscosity of 1.94 dl/g as measured at a concentration of 0.05 g/dl in 1,2,4-trichlorobenzene at 135° C.

In addition, the graft copolymer had a tacticity of 95% in terms of racemic diad as measured by $^{13}$C-NMR analysis, and a ratio by weight of styrene to acrylonitrile of 1:15.8 as measured by NMR analysis.

EXAMPLE 4

The procedure in Example 2 was repeated except that isoprene was used in place of MMA and the graft polymerization was effected at 50° C. to produce isoprene-grafted styrene/divinylbenzene copolymer at a yield of 12.3 g. In the IR spectrum of the graft copolymer, peaks assigned to the isoprene were confirmed at 840 cm$^{-1}$, 1380 cm$^{-1}$ and 2960 cm$^{-1}$, respectively.

The graft copolymer had a reduced viscosity of 1.87 dl/g as measured at a concentration of 0.05 g/dl in 1,2,4-trichlorobenzene at 135° C.

In addition, the graft copolymer had a tacticity of 95% in terms of racemic diad as measured by $^{13}$C-NMR analysis, and a ratio by weight of styrene to isoprene of 1:7.20 as measured by NMR analysis.

EXAMPLE 5

The procedure in Example 2 was repeated except that butadiene was used in place of MMA and the graft polymerization was effected at 50° C. to produce butadiene-grafted styrene/divinylbenzene copolymer at a yield of 8.4 g. In the IR spectrum of the graft copolymer, a peak assigned to the butadiene was confirmed at 960 cm$^{-1}$.

The graft copolymer had a reduced viscosity of 1.89 dl/g as measured at a concentration of 0.05 g/dl in 1,2,4-trichlorobenzene at 135° C.

In addition, the graft copolymer had a tacticity of 95% in terms of racemic diad as measured by $^{13}$C-NMR analysis, and a ratio by weight of styrene to butadiene of 1:4.60 as measured by NMR analysis.

EXAMPLE 6

The procedure in Example 2 was repeated except that tetraethoxytitanium (TET) was used as the catalyst in place of pentamethylcyclopentadienyltitanium trimethoxide in the copolymer production to produce MMA-grafted styrene/divinylbenzene copolymer at a yield of 3.5 g. In the IR spectrum of the graft copolymer, a peak assigned to the double bond (C=O) of MMA was confirmed at 1730 cm$^{-1}$.

The graft copolymer had a reduced viscosity of 2.00 dl/g as measured at a concentration of 0.05 g/dl in 1,2,4-trichlorobenzene at 135° C.

In addition, the graft copolymer had a tacticity of 95% in terms of racemic diad as measured by $^{13}$C-NMR analysis, and a ratio by weight of styrene to MMA of 1:2.18 as measure by NMR analysis.

EXAMPLE 7

The procedure in Example 2 was repeated except that hexane was used as the polymerization solvent in place of toluene to produce MMA-grafted styrene/divinylbenzene copolymer at a yield of 5.6 g. In the IR spectrum of the graft copolymer, a peak assigned to the double bond (C=O) of MMA was confirmed at 1730 cm$^{-1}$.

The graft copolymer had a reduced viscosity of 2.01 dl/g as measured at a concentration of 0.05 g/dl in 1,2,4-trichlorobenzene at 135° C.

In addition, the graft copolymer had a tacticity of 95% in terms of racemic diad as measured by $^{13}$C-NMR analysis, and a ratio by weight of styrene to MMA of 1:4.09 as measured by NMR analysis.

EXAMPLE 8

The procedure in Example 2 was repeated except that heptane was used as the polymerization solvent in place of toluene to produce MMA-grafted styrene/divinylbenzene copolymer at a yield of 8.1 g. In the IR spectrum of the graft copolymer, a peak assigned to the double bond (C=O) of MMA was confirmed at 1730 cm$^{-1}$.

The graft copolymer had a reduced viscosity of 2.05 dl/g as measured at a concentration of 0.05 g/dl in 1,2,4-trichlorobenzene at 135° C.

In addition, the graft copolymer had a tacticity of 95% in terms of racemic diad as measured by $^{13}$C-NMR analysis, and a ratio by weight of styrene to MMA of 1:6.36 as measured by NMR analysis.

EXAMPLE 9

The procedure in Example 2 was repeated except that azobisisobutyronitrile (AIBN) was used as the catalyst in place of n-BuLi in the graft reaction to produce MMA-grafted styrene/divinylbenzene copolymer at a yield of 3.1 g. In the IR spectrum of the graft copolymer, a peak assigned to the double bond (C=O) of MMA at 1730 cm$^{-1}$.

The graft copolymer had a reduced viscosity 2.07 dl/g as measured at a concentration of 0.05 g/dl in 1,2,4-trichlorobenzene at 135° C.

In addition, the graft copolymer had a tacticity of 95% in terms of racemic diad as measured by $^{13}$C-NMR analysis, and a ratio by weight of styrene to MMA of 1:1.82 as measured by NMR analysis.

EXAMPLE 10

In a 200 ml reaction vessel were placed 70 ml of toluene, 60 ml of styrene and 2 ml of p-divinylstyrene in an argon atmosphere at room temperature, and further placed 10 mmol of methylaluminoxane as prepared in Example 1 (1). The mixture was heated to 50° C.

Then, 0.1 mmol of tetraethoxytitanium was added to the mixture to effect copolymerizing reaction for one (1) hour, 5 ml of the reaction product was dispensed in argon atmosphere from the reaction system and transferred to a pressure-glass reaction vessel The resultant copolymerized powder was washed 3 times by decantation with 100 ml of hexane and 200 ml of hexane was added thereto at the last stage. To the mixture was added 2 mmol of diethylaluminum monochloride and ethylene was introduced into the vessel at 70° C. and 2.4 kg/cm$^2$G for 3 hours.

After pressure release, the graft copolymer thus obtained was cleaned by pouring into metharol, and air-dried to provide 2.85 g of graft copolymer. In order to prove that the resultant copolymer was an ethylene-grafted copolymer having syndiotactic polystyrene as the main chain, the following analysis was carried out. Firstly IR analysis and $^{13}$C-NMR analysis were performed for the graft precursor. As the result, the absorption of the vinyl group of divinylbenzene residue was observed at 1630 cm$^{-1}$, and the ratio of absorbance of vinyl group at 1630 cm$^{-1}$ to absorbance styrene residue at 1605 cm$^{-1}$, ($D_{1630}D_{1605}$) was 0.26. Also, $^{13}$C-NMR analysis showed a sharp peak assigned to quaternary carbon atom of aromatic ring at 145.2 ppm, proving that the styrene chain was of syndiotactic configuration.

As the result of IR analysis for the graft copolymer, absorption assigned to methylene chain was observed at 720 cm$^{-1}$ and 730 cm$^{-1}$, the absorbance of vinyl group derived from divinylbenzene residue decreased, and $D_{1630}/D_{1605}$ ratio also decreased to 0.16. Thus the formation of the graft copolymer has been proved by the above facts. Further, in order to obtain the graft copolymer composition, IR analysis was conducted with various compounding ratios of high density polyethylene to SPS to prepare a calibration curve from the ratio of absorbance at 720 cm$^{-1}$ to that at 1605 cm$^{-1}$.

The graft copolymer had a ratio by weight of styrene to ethylene of 1:1.03 as determined with the calibration curve thus prepared and a reduced viscosity of 1.66 dl/g as measured at a concentration of 0.05 g/dl in 1,2,4-trichlorobenzene at 135° C.

EXAMPLE 11

(1) Preparation of tri(n-butyl)ammonium tetra(pentafluorophenyl)borarate

Pentafluorophenyllithium which was prepared from 152 mmol of bromopentafluorobenzene and 152 mmol of butyllithium was reacted with 45 mmol of trichloroboron in hexane to produce tri(pentafluorophenyl)boron as white solid, 41 mmol of which was reacted with 41 mmol of pentafluoropenyllithium to produce lithium tetra(pentafluorophenyl)boron as white solid and isolate the same.

Then, 16 mmol of lithium tetra(pentafluorophenyl)boron was reacted with 16 mmol of tri-n-butylamine hydrochloride in water to produce 12.8 mmol of tri(n-butyl)ammonium tetra(pentafluorophenyl)borate as white solid.

(2) Production of styrene/divinylbenzene copolymer

In a 100 ml reaction vessel dried and made of stainless steel were placed 20 ml of styrene and 1.2 ml of divinylbenzene (the compound as described in Example 1) in argon atmosphere, and further placed 0.03 mmol of triisobutylaluminum (TIBA), and the mixture was maintained at 70° C. for 30 minutes.

Into the reaction vessel were further introduced 0.5 μmol of tri(n-butyl)ammonium tetra(pentafluorophenyl)borate as prepared in the above item (1) and 0.5 μmol of pentamethylcyclopentadienyltrimethyltitanium to initiate copolymerization with stirring. After 2 hours of copolymerization, 30 ml of dry toluene was added to the reaction system to form slurry state, and a small amount of the reaction product was sampled to perform IR analysis and $^{13}$C-NMR analysis. As the result of IR analysis, the absorption of the vinyl group in divinylbenzene residue was observed at 1630 cm$^{-1}$, and the ratio of absorbance of vinyl group at 1630 cm$^{-1}$ to absorbance of styrene residue at 1605 cm$^{-1}$, ($D_{1630}/D_{1605}$) was 0.31. Moreover, $^{13}$C-NMR analysis exhibited a sharp peak assigned to quaternary carbon atom of aromatic ring at 145.2 ppm, demonstrating the syndiotactic configuration of the styrene chain.

In order to continue the graft polymerization, ethylene was continuously introduced into the reaction system at 70° C. and at 9 kg/cm$^2$G for 10 hours. Subsequently, the pressure was released, and the graft copolymer thus obtained was cleaned by pouring into methanol and air-dried to give an amount of 4.86 g.

As the result of IR analysis of the resultant graft copolymer, absorption assigned to the methylene chain was observed at 720 cm$^{-1}$ and 730 cm$^{-1}$, the absorbance of vinyl group derived from divinylbenzene residue decreased, and $D_{1630}/D_{1650}$ ratio also decreased to 0.18. Thus, the formation of the graft copolymer has been demonstrated by the aforestated facts. Further, in order to obtain the copolymeric composition, IR analysis was carried out with various compounding ratios of high density polyethylene to SPS to prepare a calibration curve from the ratio of absorvance at 720 cm$^{-1}$ to that at 1605 cm$^{-1}$.

The graft copolymer had a ratio by weight of styrene to ethylene of 1:0.07 as determined with the calibration curve thus prepared, and a reduced viscosity of 1.34 dl/g as measured at a concentration of 0.05 g/dl in 1,2,4-trichlorobenzene at 135° C.

EXAMPLE 12

In a 0.5 L reaction vessel equipped with a stirrer which had been purged with nitrogen followed by heating to 70° C., were placed a mixture of 50 ml of sufficiently dried toluene, 50 ml of styrene and 0.1 ml of a monomer containing 66.1% by weight of divinylbenzene (meta-, para- mixture) and 33.9% by weight of ethylstyrene (meta-, para- mixture), and further placed 1.5 mmol of methylaluminoxane obtained in Example 1, item (2) and 1.5 mmol of triisobutylaluminum (TIBA) wit stirring for 30 minutes. Then, 0.003 mmol of pentamethylcyclopentadienyltitanium trimethoxide was added to the resultant mixture to effect reaction for 2 hours.

After the completion of reaction, a large amount of hexane was poured into the system to clean the graft copolymer thus produced by means of decantation. Thereafter, the total volume of the system was adjusted to 100 ml, and a solution of 3.0 mmol of n-butyllithium in hexane at 50° C. was added to the system to effect reaction for 2 hours. After the reaction, unreacted n-butyllithium was washed away by decantation in the same manner as above.

The graft copolymer thus obtained was cooled to $-78°$ C., to which were added hexane to make a total volume of 100 ml and 30 ml of glycidyl methacrylate to effect graft polymerization for 12 hours.

After the completion of reaction, the graft copolymer thus obtained was cleaned by pouring into a large amount of methanol, air-dried to give an amount of 7.8 g and subjected to Soxhlet extraction by the use of MEK as the extraction solvent to leave 93% of insoluble portion.

The graft copolymer as the above-mentioned MEK insoluble portion had a reduced viscosity of 1.47 dl/g as measured at a concentration of 0.05 g/dl in 1,2,4-trichlorobenzene at 135° C.

By the use of a differential scanning calorimeter (available from Seiko Electronics Co., Ltd. under the trademark "DSC-200"), 5.7 mg of the graft copolymer sample was heated from 50° C. to 310° at a rate of 20° C./minute, then allowed to cool from 310° C. to 30° C. at a rate of 20° C./minute and repeatedly heated from 30° C. to 315° C. at the same rate as above to observe the endothermic pattern.

As the result, it was confirmed that the aforestated graft copolymer had a melting point at 263° C. In addition, it had a syndiotacticity of 95% on higher in terms of racemic pentad as measured by $^{13}$C-NMR analysis, and a composition of 55% by weight of styrene unit and 45% by weight of glycidyl methacrylate unit, as measured by $^{1}$H-NMR analysis.

EXAMPLE 13

The procedure in Example 12 was repeated except that glycidyl methacrylate was used in a loading of 2 ml in place of 30 ml to synthesize a graft copolymer. After the completion of reaction, the graft copolymer thus obtained was cleaned by pouring into a large amount of methanol, air-dried to give an amount of 6.73 g and subjected to Soxhlet extraction by the use of MEK as the extraction solvent t o leave 97% of MEK insoluble portion.

The graft copolymer as the above-mentioned MEK insoluble portion had a reduced viscosity of 1.53 dl/g as measured at a concentration of 0.05 g/dl in 1,2,4-trichlorobenzene at 135° C.

By the use of a differential scanning calorimeter (available from Seiko Electronics Co., Ltd. under the trademark "DSC-200"), 5.7 mg of the graft copolymer sample was heated from 50° C. to 310° C. at a rate of 20° C./minute, then allowed to cool from 310° C. to 30° C. at the same rate as above and repeatedly heated from 30° C. to 310° C. at the same rate as above to observe the endothermic pattern.

As the result, it was confirmed that the aforestated graft copolymer had a melting point at 263° C. It was also that the graft copolymer had a syndiotacticity of 95% or higher in terms of racemic pentad as measured by $^{13}$C-NMR analysis and a composition of 92% by weight of styrene unit and 8 by weight of glycidyl methacrylate unit as measured by $^1$H-NMR analysis.

EXAMPLE 14

The procedure in Example 12 was repeated except that 2 g of maleic anhydride together with 2.1 g of styrene was used in place of glycidyl methacrylate, 50 mg of benzoyl peroxide was used as the polymerization initiator in place of n-buthyllithium and the graft polymerization was effected at 70° C. for 4 hours to synthesize a graft copolymer. After the completion of polymerization, the graft copolymer thus obtained was cleaned by pouring into a large amount of methanol, air-dried to give an amount of 6.0 g and subjected to Soxhlet extraction by the use of MEK as the extraction solvent to leave 98% of insoluble portion.

The graft copolymer as the above-mentioned MEK insoluble portion had a reduced viscosity of 1.37 dl/g as measured at a concentration of 0.05 g/dl in 1,2,4-trichlorobenzene at 135° C.

By the use of a differential scanning calorimeter (available from Seiko Electronics Co., Ltd. under the trademark "DSC-200"), 5.7 mg of the graft copolymer sample was heated from 50° C. to 310° C. at a rate of 20° C./minute, then allowed to cool from 310° C. to 30° C. at a rate of 20° C./minute and repeatedly heated from 30° C. to 315° C. at the same rate as above to observe the endothermic pattern.

As the result, it was confirmed that the aforestated graft copolymer had a melting point at 263° C. In addition, it had a syndiotacticity of 93% or higher in terms of racemic pentad as measured by $^{13}$C-NMR analysis, and a composition of 97% by weight of styrene unit and 3% by weight of maleic anhydride unit as measured by $^1$H-NMR analysis.

EXAMPLE 15

In a 0.5 L reaction vessel equipped with a stirrer which had been purged with nitrogen followed by heating to 70° C., were placed a mixture of 300 ml of sufficiently dried toluene, 200 ml of styrene and 30 ml of p-(4-pentenyl)styrene, and further placed 12 mmol of aluminoxane and 12 mmol of TIBA with stirring for 30 minutes. Then, 15 μmol of pentamethylcyclopentadienyltitanium trimethoxide was added to the resultant mixture to effect copolymerization for 2 hours.

After the completion of copolymerization, the copolymer thus obtained was cleaned by pouring into a large amount of methanol, air-dried to give an amount of 0.5 g and subjected to Soxhlet extraction by the use of MEK as the extraction solvent to leave 98% of insoluble portion.

The copolymer as the above-mentioned MEK insoluble portion had a reduced viscosity of 2.00 dl/g as measured at a concentration of 0.05 g/dl in 1,2,4-trichlorobenzene at 135° C.

By the use of a differential scanning calorimeter (available from Seiko Electronics Co., Ltd. under the trademark "DSC-200"), 5.7 mg of the copolymer sample was heated from 50° C. to 310° C. at a rate of 20° C./minute, then allowed to cool from 310° C. to 30° C. at a rate of 20° C./minute and repeatedly heated from 30° C. to 315° C. at the same rate as above to observe the endothermic pattern.

As the result, it was confirmed that the aforestated copolymer had a melting point at 245° C. In addition, it had a syndiotacticity of 92% or higher in terms of racemic pentad as measured by $^{13}$C-NMR analysis. In the IR spectrum of the copolymer, a stretching vibration of carbon-carbon double bond based on the styrene unit was observed at 1630 cm$^{-1}$, proving that the styrenic copolymerization had proceeded mainly at the olefinic skeleton of p-(4-pentenyl)styrene.

5 g of the copolymer was dispersed in 100 ml of toluene in an argon atmosphere, to which was added 10 ml of glycidyl methacrylate to produce graft copolymer in the same manner as Example 12.

After the completion of graft polymerization, the graft copolymer thus obtained was cleaned by pouring into a large amount of methanol, air-dried to give 6.5 g of graft copolymer, and subjected to Soxhlet extration by the use of MEK as the extraction solvent to leave 96% of insoluble portion.

The graft copolymer as the above-mentioned MEK insoluble portion had a reduced viscosity of 2.10 dl/g as measured at a concentration of 0.05 g/dl in 1,2,4-trichlorobenzene at 135° C.

By the use of a differential scanning calorimeter (available from Seiko Electronics Co., Ltd. under the trademark "DSC-200"), 5.7 mg of the graft copolymer sample was heated from 50° C. to 310° C. at a rate of 20° C./minute, then allowed to cool from 310° C. to 30° C. at a rate of 20° C./minute and repeatedly heated from 30° C. to 315° C. at the same rate as above to observe the endothermic pattern.

As the result, it was confirmed that the aforestated graft copolymer had a melting point at 244° C. In addition, it had a syndiotacticity of 91% or higher in terms of racemic pentad as measured by $^{13}$C-NMR analysis, and a composition of 80% by weight of styrene unit and 20% by weight of glycidyl methacrylate unit as measured by $^1$H-NMR analysis.

In the IR spectrum of the graft copolymer, the absorption bond at 1630 cm$^{-1}$ disappeared, proving the formation of graft copolymer.

EXAMPLE 16-1

(1) Production of styrene/divinylbenzene copolymer (graft precursor)

In a 4.0 L reaction vessel equipped with a stirrer which had been purged with nitrogen followed by heating to 70° C., were placed a mixture of 250 ml of sufficiently dried toluene, 1000 ml of styrene and 0.1 ml of a monomer containing 66.1% by weight of divinylbenzene (m-, p- mixture) and 33.9% by weight of ethylstyrene (m-, p- mixture), and further placed 8.5 mmol of methylaluminoxane and 8.5 mmol of TIBA obtained in Example 1 (1) with stirring for 30 minutes.

Then, 0.043 mmol of pentamethylcyclopentadienyltitanium trimethoxide was added to the resultant mixture to effect reaction for 5 hours. Thereafter the reaction was arrested by methanol injection and the reaction system was washed with acetic acid/methanol to decompose the catalyst composition.

The resultant styrenic copolymer was washed with methyl ethyl ketone (MEK) containing 2% by weight of p-tert-butylcatechol at 50° C. for 4 hours, and the insoluble content was 97%. The MEK-insoluble styrenic copolymer was dissolved in chloroform to produce a solution of the styrenic copolymer in chloroform. The styrenic copolymer soluble in chloroform had a weight-average molecular weight of 724,000 and a number-average molecular weight of 243,000.

As the result of differential scanning calorimetry using a differential scanning calorimeter (available from Perkin Elmer Corp. under the trademark "DSC-II"), it was confirmed that the copolymer had a melting point at 268° C., a glass transition point at 98° C. Also, as the result of $^{13}$C-NMR analysis, aromatic ring $C_1$ carbon signals were observed at 145.2 ppm, proving the syndiotactic configuration of the resultant copolymer. In the IR spectrum, the absorption of vinyl group in divinylbenzene residue was observed.

(2) Graft polymerization with n-phenyl maleimide (nPMI)

The styrene-divinylbenzene copolymer obtained in the above precedure (1) was washed with toluene, further washed with methanol sufficiently, dried at 40° C. under reduced pressure, placed in a 1 L reactor equipped with a stirrer in an amount of 140 g. and the space in the reactor was replaced with nitrogen. Then, 420 ml of sufficiently dried toluene was added to the system under heating to 50° C. and gentle stirring. After one hour, a solution of 45.9 g of nPMI in 200 ml of sufficiently dried THF and a solution of 2.13 g of azobisisobutyronitrile (AIBN) as a radical initiator in 30 ml of sufficiently dried THF were added to the system, which was heated to 70° C. to effect graft polymerization for 5 hours. Thereafter, the graft polymerization was arrested by methanol injection and the system was sufficiently washed with acetone as the solvent suitable for nPMI and N,N-dimethylformamide as the solvent suitable for poly-nPMI. After the completion of reaction, the reaction product was cleaned by pouring into a large amount of methanol, air-dried to give 163 g of copolymer as the insoluble content of 90%. The graft copolymer had a reduced viscosity of 1.30 dl/g as measured at a concentration of 0.05 g/dl in 1,2,4-trichlorobenzene at 135° C.

By the use of a differential scanning calorimeter (available from Seiko Electronics Co., Ltd. under the trademark "DSC-200"), 5.7 mg of the copolymer sample was heated from 50° C. to 310° C. at a rate of 20° C./minute, then allowed to cool from 310° C. to 30° C. at the same rate as above and repeatedly heated from 30° C. to 310° C. at the same rate as above to observe the endothermic pattern.

As the result, it was confirmed that the graft copolymer had a melting point at 265° C. In addition, as the result of $^{13}$C-NMR analysis, aromatic signals assigned to syndiotactic configuration were observed at 145.4 ppm with the syndiotacticity of 94% or higher in terms of racemic pentad. The content of nPMI in the above graft copolymer was proved to be 8% by weight by $^1$H-NMR analysis. In IR spectrum, the peak at 1630 cm$^{-1}$ assigned to the double bond of divinylbenzene disappeared and a new peak attributable to (C=O) of nPMI appeared at 1710 cm$^{-1}$.

EXAMPLES 16-2 TO 16-14

The procedure in Example 16-1 was repeated except the conditions given in Table 1.

In the case where the monomer was α-methylstyrene in the graft polymerization, the precursor was added to 600 ml of n-heptane and after cooling to −78° C., to the resultant mixture were added 5 ml of solution of triethyloxonium tetrafluoroborate in methylene chloride (1 mol/L) and sufficiently dried α-methylstyrene with gentle stirring to effect graft polymerization for 6 hours.

In the case where the monomeer was norbornene in the graft polymerization, the precursor was added to 420 ml of toluene and after heating to 50° C., to the resultant mixture were added 0.75 ml of nickel acetylacetonate solution (0.02 mol/L), 3 mmol of methylaluminoxane and solution of norbornene in toluene (6.7 mol/L) with gentle stirring to effect graft polymerization for 6 hours.

In Examples 16-1, 16-10 and 16-14, the styrenic graft copolymer was pelletized by the use of a biaxial kneader at a cylinder temperature of 300° C., injection molded at 300° C. to Produce test pieces and further, the test pieces were heat treated at 230° C. for 10 minutes.

The resultant test pieces were tested for heat distortion temperature (HDT; JIS-K7270) and for flexural modulus of elasticity (JIS-K7203) with the results given in Table 1. As the standard physical properties, SPS had a heat distortion temperature of 100.3° C. and a flexural modulus of elasticity of 39,500 kg/cm$^2$.

EXAMPLE 17 AND COMPARATIVE EXAMPLES 1 TO 3

Figure 1:
Figure 4:
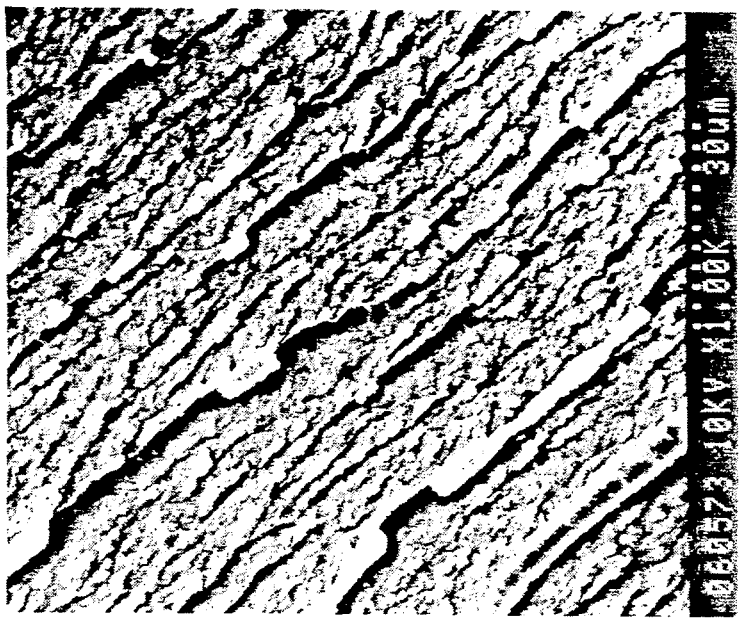
Figure 3:
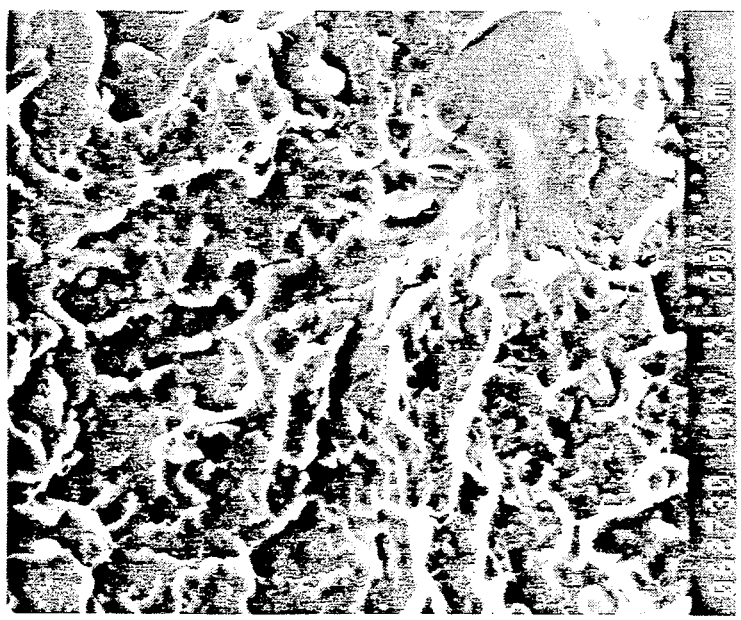
Figure 6:
Figure 5:
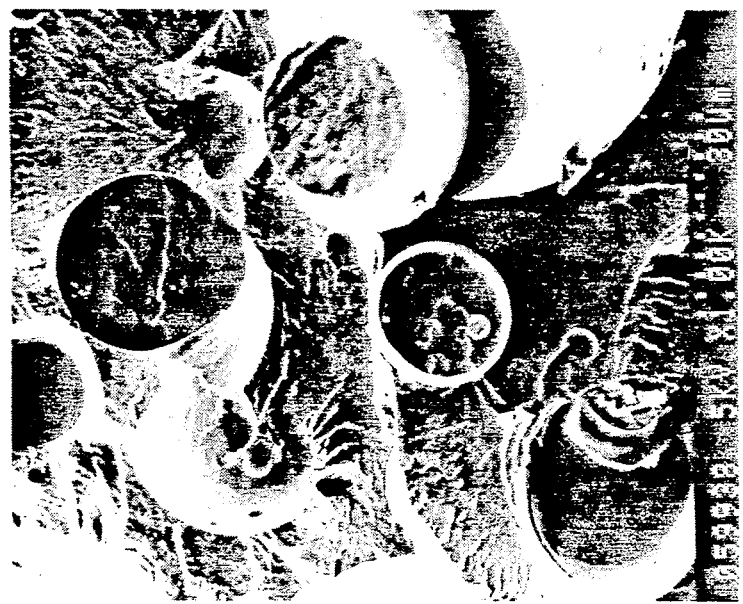
Figure 7:
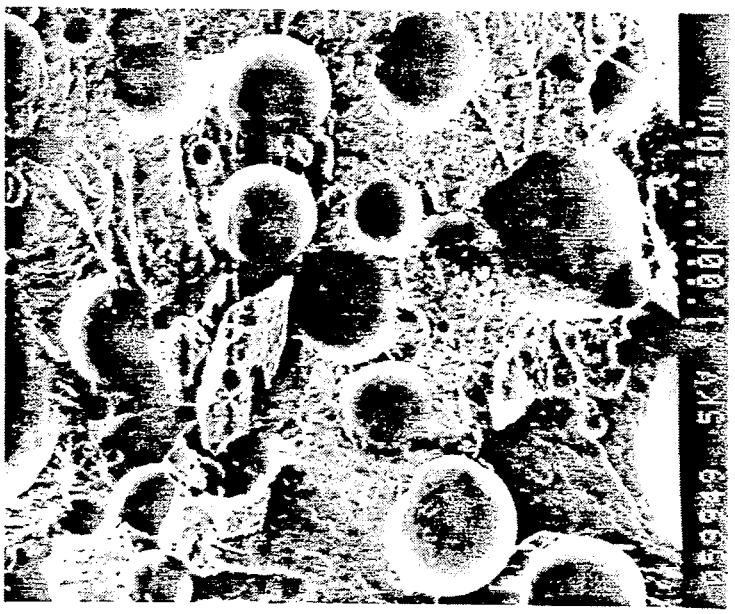

By the use of the styrenic graft copolymers obtained in Examples 12 and 14, the resins having the compounding ratios shown in Table 2 were prepared and kneaded at 300° C. for 5 minutes with a miniature molding machine (available from Custom Scientific Instrument Inc, Model "CS-183") followed by extrusion to produce strands. FIGS. 1 to 7 are each an electron micrograph (×1000 magnification) showing the rupture cross-section of each of the strands thus obtained.

EXAMPLES 18 AND COMPARATIVE EXAMPLES 4 TO 6

Figure 8:
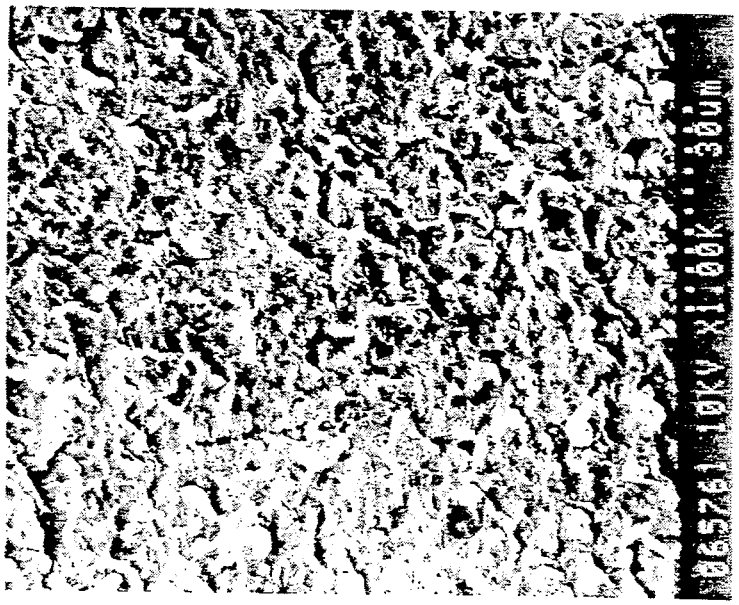
FIGS. 8 to 14 are each an electron micrograph ($\times 1000$ magnification) showing the rupture cross-section of the composition obtained in Example 18 or Comparative Examples 4 to 6.
Figure 10:
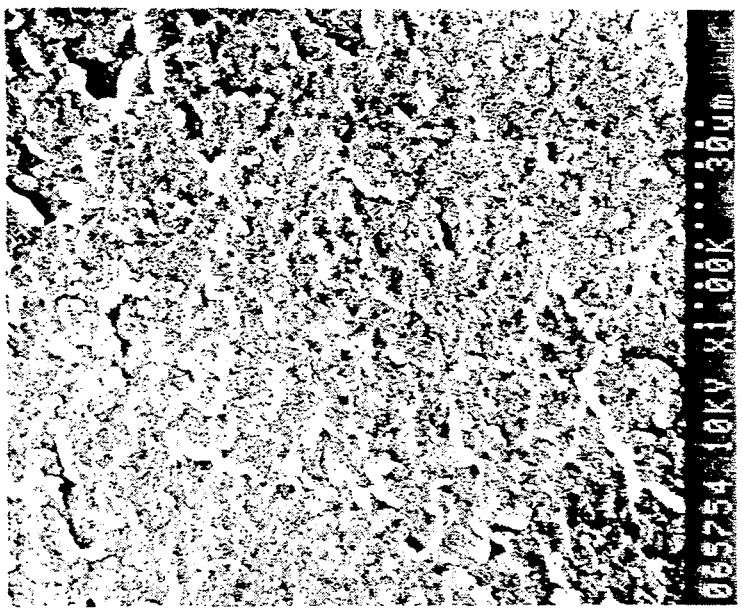
Figure 9:
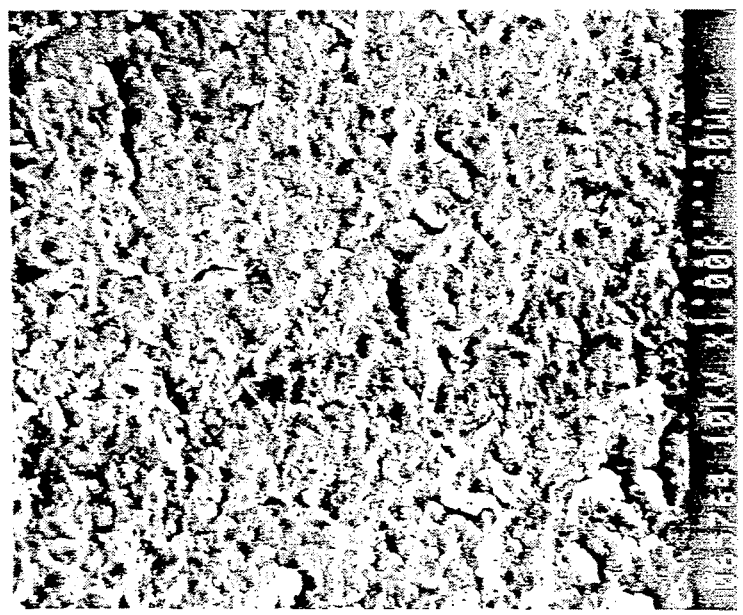
Figure 12:
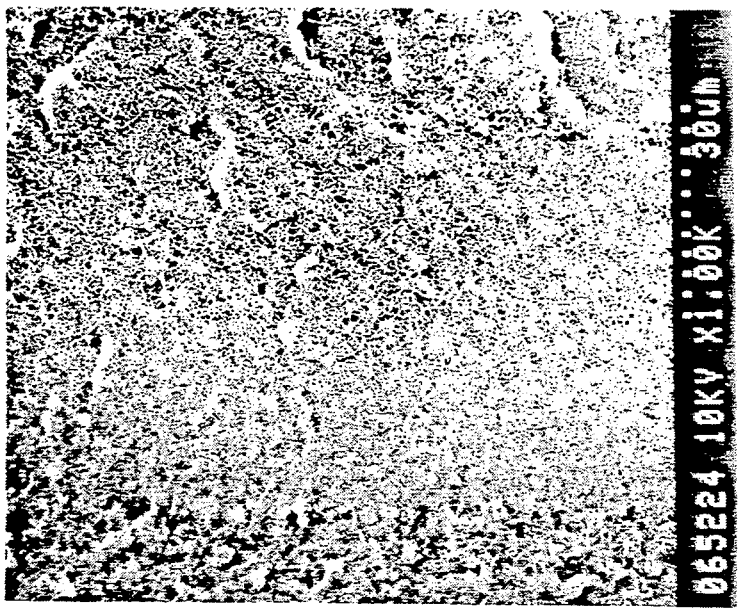
Figure 11:
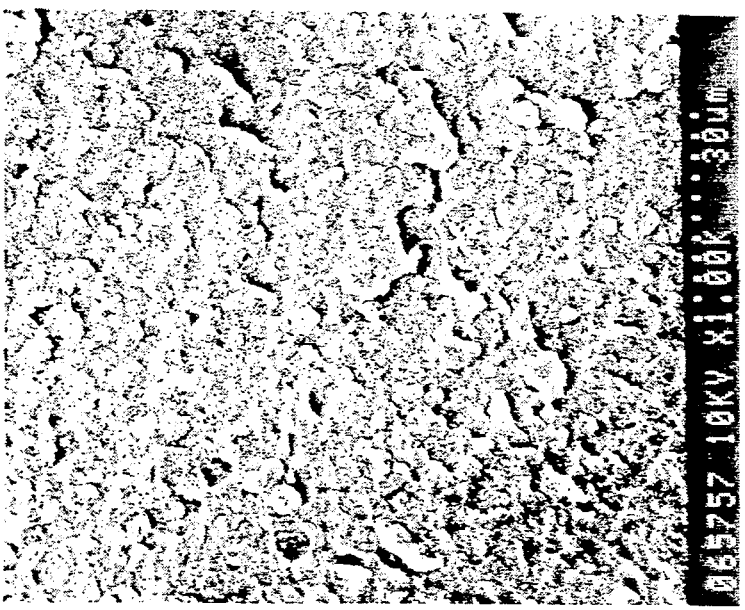
Figure 14:
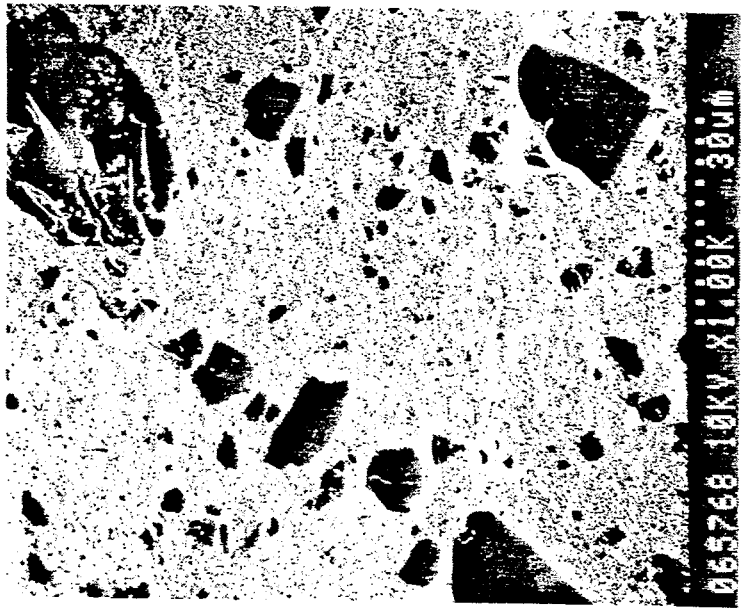
Figure 13:
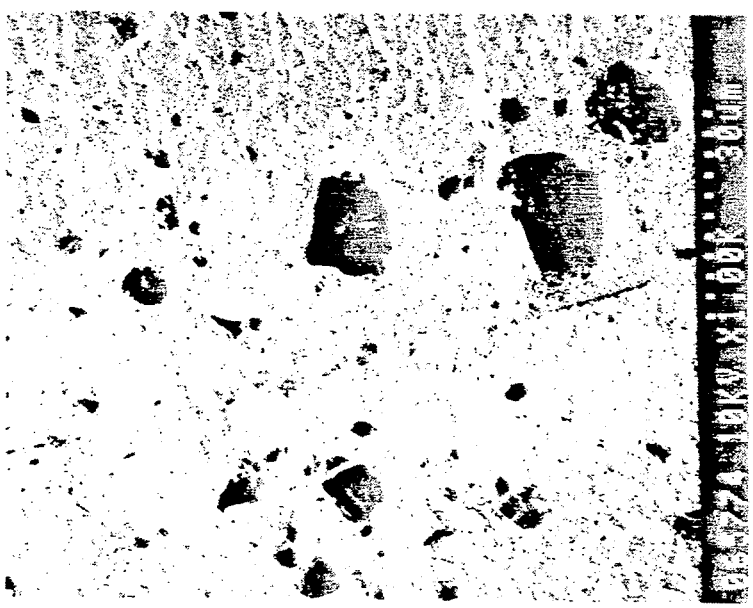

The procedure in Example 17 was repeated except that the styrenic graft copolymers obtained in Examples 16-4, 16-7 and 16-14 were used and kneaded according to the compounding ratios shown in Table 3. The results are shown in Table 3 and FIGS. 8 to 14.

In Examples 18-1 and 18-2 and Comparative Examples 5, the test pieces which were injection molded according to Example 16-1 were tested for heat distortion temperature and flexural modulus of elasticity. The results are given in Table 4.

TABLE 1

| (Synthesis of precursor) | | | |
|---|---|---|---|
| Styrene | Styrene derivative | MIP*$^1$ | Tm*$^2$ |

TABLE 1-continued

| No. | (ml) | (ml) | (%) | (°C.) | Mw*3 |
|---|---|---|---|---|---|
| Example 16-1 | 1000 | DVB*4 | 6.2 | 97 | 268 | 724 × 10*3 |
| Example 16-2 | 1000 | DVB | 3.7 | 98 | 269 | 857 × 10*3 |
| Example 16-3 | 1000 | DVB | 2.5 | 98 | 269 | 911 × 10*3 |
| Example 16-4 | 1000 | DVB | 6.2 | 97 | 268 | 724 × 10*3 |
| Example 16-5 | 1000 | DVB | 6.2 | 97 | 268 | 724 × 10*3 |
| Example 16-6 | 1000 | DVB | 6.2 | 97 | 268 | 724 × 10*3 |
| Example 16-7 | 1000 | DVB | 6.2 | 97 | 268 | 724 × 10*3 |
| Example 16-8 | 1000 | DVB | 6.2 | 97 | 263 | 724 × 10*3 |
| Example 16-9 | 1000 | 4PST*5 | 8.3 | 94 | 263 | 638 × 10*3 |
| Example 16-10 | 1000 | DVB | 6.2 | 97 | 268 | 724 × 10*3 |
| Example 16-11 | 1000 | DVB | 6.2 | 97 | 268 | 724 × 10*3 |
| Example 16-12 | 1000 | 4PST | 8.3 | 94 | 263 | 638 × 10*3 |
| Example 16-13 | 1000 | DVB | 6.2 | 97 | 268 | 724 × 10*3 |
| Example 16-14 | 1000 | 4PST | 8.3 | 94 | 263 | 638 × 10*3 |

(Graft polymerization)

| No. | Amount of precursor used (g) | Grafting monomer (g) | | Initiator (mmol) | |
|---|---|---|---|---|---|
| Example 16-1 | 140 | nPMI | 45.9 | AIBN*7 | 13 |
| Example 16-2 | 140 | nPMI | 27.5 | AIBN | 13 |
| Example 16-3 | 140 | nPMI | 18.3 | AIBN | 13 |
| Example 16-4 | 140 | nPMI | 114.8 | AIBN | 13 |
| Example 16-5 | 140 | nPMI | 45.9 | ACN*8 | 16 |
| Example 16-6 | 140 | oMPMI*12 | 49.6 | AIBN | 13 |
| Example 16-7 | 140 | nCMI*6 | 47.2 | AIBN | 13 |
| Example 16-8 | 140 | nPMI | 11.4 | AIBN | 13 |
| Example 16-9 | 140 | nPMI | 50.0 | AIBN | 13 |
| Example 16-10 | 80 | MeSt*13 | 45.6 | TBF*9 | 5 |
| Example 16-11 | 80 | MeSt*13 | 45.6 | BFD*10 | 5 |
| Example 16-12 | 80 | MeSt*13 | 45.6 | TBF | 5 |
| Example 16-13 | 80 | Norbornene | 37.9 | *11 | |
| Example 16-14 | 80 | Norbornene | 37.0 | *11 | |

(Graft copolymer)

| No. | Yield (g) | Reduced viscosity*14 (dl/g) | Tm (°C.) | Tacticity (%) |
|---|---|---|---|---|
| Example 16-1 | 163 | 3.03 | 265 | 94 |
| Example 16-2 | 159 | 2.22 | 266 | 93 |
| Example 16-3 | 155 | 1.92 | 267 | 95 |
| Example 16-4 | 200 | 3.97 | 258 | 89 |
| Example 16-5 | 161 | 2.72 | 263 | 92 |
| Example 16-6 | 163 | 2.12 | 261 | 91 |
| Example 16-7 | 162 | 2.07 | 264 | 90 |
| Example 16-8 | 150 | 1.98 | 264 | 94 |
| Example 16-9 | 171 | 4.21 | 257 | 90 |
| Example 16-10 | 107 | 1.99 | 252 | 92 |
| Example 16-11 | 105 | 1.98 | 254 | 93 |
| Example 16-12 | 112 | 1.91 | 251 | 90 |
| Example 16-13 | 109 | 2.10 | 261 | 91 |
| Example 16-14 | 111 | 2.21 | 259 | 90 |

(Graft copolymer)

| No. | Graft segment (wt %) | Heat distortion temperature (°C.) | Flexural modulus of elasticity (kg/cm²) |
|---|---|---|---|
| Example 16-1 | 14.1 | 129.8 | 43,800 |
| Example 16-2 | 11.8 | — | — |
| Example 16-3 | 9.7 | — | — |
| Example 16-4 | 30.3 | — | — |
| Example 16-5 | 13.0 | — | — |
| Example 16-6 | 14.1 | — | — |
| Example 16-7 | 13.5 | — | — |
| Example 16-8 | 7.1 | — | — |
| Example 16-9 | 18.2 | — | — |
| Example 16-10 | 25.0 | 126.3 | 42,500 |
| Example 16-11 | 23.8 | — | — |
| Example 16-12 | 28.5 | — | — |
| Example 16-13 | 35.7 | — | — |
| Example 16-14 | 27.8 | 121.8 | 43,500 |

*1Methyl ethyl ketone insoluble portion
*2Melting point
*3Weight-average molecular weight expressed in terms of standard polystyrene
*4Divinylbenzene
*5 4-pentenylstyrene
*6N-cyclohexyl maleimide
*7Azobisisobutyronitrile
*8Azobiscyclohexane carbonitrile
*9Triethyloxonium boron tetrafluoride
*10Boron trifluoride diethyletherate
*11 0.03 mmol of nickel acetyloacetonato and 3 mmol of methylaluminoxane were used.
*12N-(o-methylphenyl)maleimide
*13α-methylstyrene
*14Measured at 0.05 g/dl concentration in 1,2,4-trichlorobenzene at 135° C.

TABLE 2

| No. | Resin and compounding ratio (parts by weight) | | | | | Figure |
|---|---|---|---|---|---|---|
| | GMA-SPS*1 | MAn-SPS*2 | SPS | Nylon 6·6*3 | PET*4 | |
| Example 17-1 | 0.2 | — | 0.4 | 0.4 | — | 1 |
| Example 17-2 | 0.2 | — | 0.4 | — | 0.4 | 2 |
| Example 17-3 | — | 0.2 | 0.4 | 0.4 | — | 3 |
| Example 17-4 | — | 0.5 | 0.5 | — | — | 4 |
| Comparative Example 1 | — | — | 0.5 | 0.5 | — | 5 |
| Comparative Example 2 | — | — | 1.0 | — | — | 6 |
| Comparative Example 3 | — | — | 0.5 | — | 0.5 | 7 |

*1Obtained in Example 12
*2Obtained in Example 14
*3Produced by Ube Kosan Co., Ltd. under the trademark "2020 B"
*4Produced by Mitsubishi Rayon Co., Ltd. under the trademark "MA-560-R"

TABLE 3

Resin and compounding ratio (parts by weight)

| No. | Styrenic graft copolymer | | | Others | | | FIG. |
|---|---|---|---|---|---|---|---|
| | nPMI-SPS[*1] | nCMI-SPS[*2] | Morbornene-SPS[*3] | SPS | Poly-nPMI[*4] | Polynorbornene[*5] | |
| Example 18-1 | 1.6 | — | — | 0.4 | — | — | 8 |
| Example 18-2 | 1.0 | — | — | 1.0 | — | — | 9 |
| Example 18-3 | — | 1.0 | — | 1.0 | — | — | 10 |
| Example 18-4 | — | — | 1.6 | 0.4 | — | — | 11 |
| Example 18-5 | — | — | 1.0 | 1.0 | — | — | 12 |
| Comparative Example 4 | — | — | — | 1.8 | 0.2 | — | 13 |
| Comparative Example 5 | — | — | — | 1.6 | 0.4 | — | 14 |
| Comparative Example 6 | — | — | — | 1.8 | — | 0.2 | *6 |

[*1]Obtained in Example 16-4
[*2]Obtained in Example 16-7
[*3]Obtained in Example 16-14
[*4]n-phenyl maleimide homopolymer, synthesized according to "Macromolecules" vol 23, pp. 4508-4513, 1991.
[*5]Norbornene homopolymer, produced by a process wherein in a 0.5 liter reactor with a stirrer previously $N_2$-purged were placed 150 ml of dry toluene, 0.08 mmol of nickel acetylacetonate, 16 mmol of methylaluminoxane and 186 ml of solution of norbornene in toluene (6.7 mol) to effect reaction at 50° C. for 4 hours at a yield of 75%.
[*6]Not moldable.

TABLE 4

| No. | Heat distortion temperature (°C.) | Flexural modulus of elasticity (kg/cm$^2$) |
|---|---|---|
| Example 18-1 | 115.5 | 48,600 |
| Example 18-5 | 114.9 | 46,900 |
| Comparative Example 5 | 102.8 | 40,800 |

EXAMPLE 19

70 wt % of resin compound comprising 20 wt % of styrenic graft copolymer obtained in Example 12 and/or 14 and 80 wt % of SPS, and 30 wt % of chopped glass fiber strand of 3 mm in length were melt blended at 300° C. to produce glass-fiber reinforced resin composition. Sufficient adhesion of the resin to the glass fiber was recognized by observing the rupture cross section of the composition.

EXAMPLE 20

40 mg of the styrenic graft copolymer (glycidyl methacrylate unit of 45 wt %) obtained in Example 12 was sandwiched between two aluminum sheets (50 μm thick, 15 mm wide) so as to form an adhesive surface of 15 mm by 15 mm, and the resultant laminate was heated at 300° C. for 2 minutes followed by pressing for one minute at 10 kg/cm$^2$ to form a multi-layer material. A test piece of the multi-layer material thus obtained was tested for adhesive strength under shear at a pull rate of 20 mm/minute with the result of 30.5 kg/(15 mm ×15 mm).

The results obtained by the use of copper sheets and glass sheets in place of aluminum sheets were 28.0 kg/(15 mm ×15 mm) and 35.0 kg/(15 mm ×15mm), respectively. On the other hand, both SPS and styrene/divinylbenzene copolymer sandwiched in the same manner as above failed to cause adhesion.

EXAMPLE 21

The procedure in Example 19 was repeated except that the styrenic graft copolymer obtained in Example 13 (glycidyl methacrylate unit of 8 wt %) were used to produce a multi-layer material, a test piece of which was tested for adhesive strength under shear at a pull rate of 20 mm/minute. The result was 29.0 kg/(15 mm ×15 mm).

The results obtained by the use of copper sheets and glass sheets in place of aluminum sheets were 26.0 kg/(15 cm ×15 cm) and 31.0 kg/(15 mm ×15 mm), respectively.

EXAMPLE 22

The resin compositions obtained in Example 17 and Comparative Example 1 to 3 were compounded according to the composition in Table 5 and press molded at 300° C. to form each sheet of 50 mm ×50 mm ×0.5 mm in size. Each of the sheets thus obtained was press molded for 5 minutes at the temperature shown in Table 5, at a pressure of 0.5 kg/cm$^2$ to produce a multi-layer material. The results are also given in Table 5.

TABLE 5

| Resin Composition | Substrate | Lamination temperature (°C.) | Laminated condition |
|---|---|---|---|
| Example 17-1 | Aluminum | 300 | Good |
| Example 17-2 | Copper | 300 | Good |
| Example 17-3 | Aluminum | 300 | Good |
| Example 17-4 | Nylon 6 · 6 | 240 | Good |
| Comparative Example 1 | Aluminum | 300 | Cracking in resin layer |
| Comparative Example 2 | Copper | 300 | Cracking in resin layer |
| Comparative Example 3 | Nylon 6 · 6 | 240 | Interlaminar separation |

What is claimed is:

1. A process for producing a styrenic graft copolymer which comprises copolymerizing a styrenic monomer and a styrenic monomer having a hydrocarbon radical with an unsaturated bond in the presence of a catalyst comprising as primary ingredients (A) a transition metal compound and (B) a contact product of an organoaluminum compound and a condensation agent and subsequently graft polymerizing an ethylenically unsaturated monomer onto the resultant styrenic copolymer.

2. A process for producing a styrenic graft copolymer which comprises copolymerizing a styrenic monomer and a styrenic monomer having a hydrocarbon radical with an unsaturated bond in the presence of a catalyst comprising as primary ingredients (A) a transition metal compound and (C) a compound which produces an ionic complex by reacting with said transition metal compound and subsequently graft polymerizing an ethylenically unsaturated monomer onto the resultant styrenic copolymer.

3. The process according to claim 1 or 2, wherein said styrenic copolymer has syndiotactic configuration.

4. The process according to claim 1 or 2, wherein said styrenic monomer is a styrenic monomer I represented by the general formula (1)

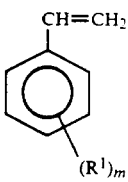

wherein $R^1$ is a hydrogen atom, a halogen atom or a substituent having at least one atom selected from carbon, oxygen, nitrogen, sulfur, phosphorus, selenium, silicon and tin, m is an integer from 1 to 3 and when m is 2 or 3, each $R^1$ may be the same or different; said styrenic monomer having a hydrocarbon radical with an unsaturated bond is a styrenic monomer II represented by the general formula (2)

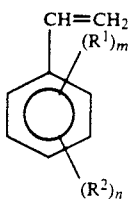

wherein $R^2$ is a hydrocarbon radical with an unsaturated bond, n is an integer of 1 or 2, and $R^1$ and m are as previously defined; and said ethylenically unsaturated monomer is a monomer represented by the general formula (3)

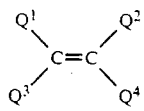

wherein $Q^1$, $Q^2$, $Q^3$ and $Q^4$ are each a hydrogen atom, a halogen atom or a substituent having at least one atom selected from carbon, oxygen, nitrogen, sulfur, phosphorus, selenium, silicon and tin, and may be the same or different.

5. The process according to claim 1 or 2, wherein said ethylenically unsaturated monomer is a monomer selected from the group consisting of (1) acrylic acid, methacrylic acid and derivatives thereof, (2) acrylamide, methacrylamide and derivatives thereof, (3) vinyl acetate and derivatives thereof, (4) cinnemic acid, crotonic acid and derivatives thereof, (5) acrylonitrile, methacrylonitrile and derivatives thereof, (6) maleic acid, fumaric acid, maleic anhydride and derivatives thereof, (7) maleimide and derivatives thereof, (8) itaconic acid, itaconic anhydride and derivative thereof, (9) acroleins, (10) vinyl ketones, (11) diolefins, (12) styrene and derivatives thereof, (13) α-olefins and (14) cyclic olefins.

6. A styrenic graft copolymer produced by graft polymerizing an ethylenically unsaturated monomer onto a copolymer of a styrenic monomer and a styrenic monomer having a hydrocarbon radical with an unsaturated bond.

7. The styrenic graft copolymer according to claim 6, wherein said styrenic copolymer has syndiotactic configuration.

8. The styrenic graft copolymer according to claim 6 or 7, wherein said ethylenically unsaturuted monomer is a monomer having a polar group.

9. The styrenic graft copolymer according to claim 6 or 7, wherein said graft copolymer has a graft segment content of 0.005 to 99% by weight and a reduced viscosity of 0.01 to 20 dl/g as measured at a concentration of 0.05 g/dl in 1,2,4-trichlorobenzene at 135° C.

10. A resin composition which comprises a styrenic graft copolymer produced by graft copolymerizing an ethylenically unsaturated monomer onto a copolymer of a styrenic monomer and a styrenic monomer having a hydrocarbon radical with an unsaturated bond and at least one member selected from a thermoplastic resin, an inorganic filler and an organic filler.

11. The composition according to claim 10, wherein said styrenic copolymer has syndiotactic configuration.

12. A multi-layer material which comprises at least one layer containing a styrenic graft copolymer produced by graft polymerizing an ethylenically unsaturated monomer onto a copolymer of a styrenic monomer and a styrenic monomer having a hydrocarbon radical with an unsaturated bond.

13. The multi-layer material according to claim 12, wherein said styrenic copolymer has syndiotactic configuration.

14. The multi-layer material according to claim 11 or 12, comprising at least one layer containing said styrenic graft copolymer and a layer composed of at least one material selected from the group consisting of resin, metal, ceramics, glass, paper, fiber, textile and wood.

15. A styrenic copolymer which comprises a styrenic monomer and a styrenic monomer with an unsaturated hydrocarbon radical having a styrenic skeleton and α-olefinic skeleton in the same molecule, the double bond of the styrenic skeleton of said styrenic monomer with unsaturated hydrocarbon radical remaining unsaturated.

* * * * *